US008275606B2

(12) United States Patent
Sakashita et al.

(10) Patent No.: US 8,275,606 B2
(45) Date of Patent: Sep. 25, 2012

(54) SYSTEM AND METHOD FOR LOCALIZING ASSETS USING FLEXIBLE METADATA

(75) Inventors: Tadashi George Sakashita, Salt Lake City, UT (US); Bruce Gifford, Taylorsville, UT (US); Jonathan C. Scholtz, Rialto, CA (US)

(73) Assignee: Disney Enterprises, Inc., Burbank, CA (US)

( * ) Notice: Subject to any disclaimer, the term of this patent is extended or adjusted under 35 U.S.C. 154(b) by 921 days.

(21) Appl. No.: 12/020,130

(22) Filed: Jan. 25, 2008

(65) Prior Publication Data

US 2009/0112575 A1    Apr. 30, 2009

Related U.S. Application Data

(60) Provisional application No. 60/982,701, filed on Oct. 25, 2007.

(51) Int. Cl.
*G06F 17/20* (2006.01)
*A63F 13/10* (2006.01)

(52) U.S. Cl. .................................. 704/8; 463/1
(58) Field of Classification Search .......................... None
See application file for complete search history.

(56) References Cited

U.S. PATENT DOCUMENTS

| | | | |
|---|---|---|---|
| 4,456,973 A | 6/1984 | Carlgren et al. ............... 364/900 |
| 5,377,997 A | 1/1995 | Wilden et al. |
| 5,572,668 A | 11/1996 | See et al. |
| 6,264,562 B1 | 7/2001 | McSheffrey et al. |
| 6,526,426 B1 | 2/2003 | Lakritz |
| 6,567,973 B1 * | 5/2003 | Yamamoto et al. ........... 717/136 |
| 6,725,759 B1 * | 4/2004 | Kathe et al. .......................... 89/8 |
| 6,735,759 B1 * | 5/2004 | Yamamoto et al. ........... 717/136 |
| 6,773,344 B1 | 8/2004 | Gabai et al. |
| 6,782,510 B1 | 8/2004 | Gross et al. .................... 715/533 |
| 6,983,238 B2 | 1/2006 | Gao |
| 6,993,476 B1 | 1/2006 | Dutta et al. ........................ 704/9 |
| 7,207,005 B2 | 4/2007 | Lakritz |
| 7,571,092 B1 | 8/2009 | Nieh ................................. 704/2 |
| 7,698,126 B2 | 4/2010 | Kohlmeier et al. ............... 704/8 |
| 7,711,546 B2 | 5/2010 | Mola Marti et al. .............. 704/5 |
| 7,716,037 B2 | 5/2010 | Precoda et al. ................... 704/2 |
| 7,752,034 B2 | 7/2010 | Brockett et al. .................. 704/9 |
| 2001/0029455 A1 | 10/2001 | Chin et al. .................... 704/277 |
| 2002/0040359 A1 | 4/2002 | Green et al. ...................... 707/3 |

(Continued)

FOREIGN PATENT DOCUMENTS

WO        WO00/38052    *   6/2000

(Continued)

OTHER PUBLICATIONS

Brandon, "Localization of Web Content", 2001.

(Continued)

*Primary Examiner* — Talivaldis Ivars Smits
(74) *Attorney, Agent, or Firm* — Pillsbury Winthrop Shaw Pittman LLP

(57) ABSTRACT

A system and method for managing localization workflow for video game development is disclosed. The method includes determining that a string is to be translated. The method further includes associating a translator with the string. The method further includes providing video metadata to the translator, wherein the video metadata includes at least video information from game play of the video game being developed such that the translator is provided with context for the translation.

10 Claims, 20 Drawing Sheets

U.S. PATENT DOCUMENTS

| | | |
|---|---|---|
| 2002/0045484 A1 | 4/2002 | Eck et al. |
| 2002/0065658 A1 | 5/2002 | Kanevsky et al. ............ 704/260 |
| 2003/0110469 A1* | 6/2003 | Jackson ........................ 717/113 |
| 2003/0115552 A1* | 6/2003 | Jahnke et al. ................. 715/536 |
| 2006/0053001 A1 | 3/2006 | Brockett et al. ................... 704/9 |
| 2006/0100858 A1 | 5/2006 | McEntee et al. |
| 2006/0129383 A1 | 6/2006 | Oberlander et al. ............ 704/10 |
| 2006/0173671 A1 | 8/2006 | Okawa |
| 2006/0206303 A1 | 9/2006 | Kohlmeier et al. |
| 2006/0206877 A1 | 9/2006 | Kohlmeier et al. |
| 2007/0050182 A1 | 3/2007 | Sneddon et al. ................. 704/2 |
| 2007/0129932 A1 | 6/2007 | Chen et al. ....................... 704/2 |
| 2007/0245321 A1 | 10/2007 | Cosgrove et al. |
| 2007/0276671 A1 | 11/2007 | Gudigara et al. |
| 2009/0111585 A1 | 4/2009 | Sakashita et al. .............. 463/43 |
| 2009/0112577 A1 | 4/2009 | Gifford et al. ..................... 704/9 |
| 2009/0113445 A1 | 4/2009 | Sakashita et al. ............. 719/313 |

FOREIGN PATENT DOCUMENTS

WO    WO 2006/032846 A2    3/2006

OTHER PUBLICATIONS

Lu et al., "LabelTool a Localization Application for Devices with Restricted Display Areas", 2000.

* cited by examiner

| 1st Grade | 2nd Grade | 3rd Grade | 4th Grade | 5th Grade | 6th Grade |
|---|---|---|---|---|---|
| 一 | 引 | 悪 | 愛 | 圧 | 異 |
| 右 | 羽 | 安 | 案 | 移 | 遺 |
| 雨 | 雲 | 暗 | 以 | 因 | 域 |
| 円 | 園 | 医 | 衣 | 永 | 宇 |
| 王 | 遠 | 委 | 位 | 営 | 映 |
| 音 | 何 | 意 | 囲 | 衛 | 延 |
| 下 | 科 | 育 | 胃 | 易 | 沿 |
| 火 | 夏 | 員 | 印 | 益 | 我 |
| 花 | 家 | 院 | 英 | 液 | 灰 |
| 貝 | 歌 | 飲 | 栄 | 演 | 拡 |
| 学 | 画 | 運 | 塩 | 応 | 革 |
| 気 | 回 | 泳 | 億 | 往 | 閣 |
| 九 | 会 | 駅 | 加 | 桜 | 割 |
| 休 | 海 | 央 | 果 | 恩 | 株 |
| 玉 | 絵 | 横 | 貨 | 可 | 干 |
| 金 | 外 | 屋 | 課 | 仮 | 巻 |
| 空 | 角 | 温 | 芽 | 価 | 看 |
| 月 | 楽 | 化 | 改 | 河 | 簡 |
| 犬 | 活 | 荷 | 械 | 過 | 危 |
| 見 | 間 | 界 | 害 | 賀 | 机 |
| 五 | 丸 | 開 | 街 | 快 | 揮 |
| 口 | 岩 | 階 | 各 | 解 | 貴 |
| 校 | 顔 | 寒 | 覚 | 格 | 疑 |
| 左 | 汽 | 感 | 完 | 確 | 吸 |
| 三 | 記 | 漢 | 官 | 額 | 供 |
| 山 | 帰 | 館 | 管 | 刊 | 胸 |
| 子 | 弓 | 岸 | 関 | 幹 | 郷 |
| 四 | 牛 | 起 | 観 | 慣 | 勤 |
| 糸 | 魚 | 期 | 願 | 眼 | 筋 |
| 字 | 京 | 客 | 希 | 基 | 系 |
| 耳 | 強 | 究 | 季 | 寄 | 敬 |
| 七 | 教 | 急 | 紀 | 規 | 警 |
| 車 | 近 | 級 | 喜 | 技 | 劇 |
| 手 | 兄 | 宮 | 旗 | 義 | 激 |
| 十 | 形 | 球 | 器 | 逆 | 穴 |
| 出 | 計 | 去 | 機 | 久 | 絹 |
| 女 | 元 | 橋 | 議 | 旧 | 権 |
| 小 | 言 | 業 | 求 | 居 | 憲 |
| 上 | 原 | 曲 | 泣 | 許 | 源 |
| 森 | 戸 | 局 | 救 | 境 | 厳 |
| 人 | 古 | 銀 | 給 | 均 | 己 |

FIG. 9B₁

| | | | | | |
|---|---|---|---|---|---|
| 水 | 午 | 区 | 挙 | 禁 | 呼 |
| 正 | 後 | 苦 | 漁 | 句 | 誤 |
| 生 | 語 | 具 | 共 | 群 | 后 |
| 青 | 工 | 君 | 協 | 経 | 孝 |
| 夕 | 公 | 係 | 鏡 | 潔 | 皇 |
| 石 | 広 | 軽 | 競 | 件 | 紅 |
| 赤 | 交 | 血 | 極 | 券 | 降 |
| 千 | 光 | 決 | 訓 | 険 | 鋼 |
| 川 | 考 | 研 | 軍 | 検 | 刻 |
| 先 | 行 | 県 | 郡 | 限 | 穀 |
| 早 | 高 | 庫 | 径 | 現 | 骨 |
| 草 | 黄 | 湖 | 型 | 減 | 困 |
| 足 | 合 | 向 | 景 | 故 | 砂 |
| 村 | 谷 | 幸 | 芸 | 個 | 座 |
| 大 | 国 | 港 | 欠 | 護 | 済 |
| 男 | 黒 | 号 | 結 | 効 | 裁 |
| 竹 | 今 | 根 | 建 | 厚 | 策 |
| 中 | 才 | 祭 | 健 | 耕 | 冊 |
| 虫 | 細 | 皿 | 験 | 鉱 | 蚕 |
| 町 | 作 | 仕 | 固 | 構 | 至 |
| 天 | 算 | 死 | 功 | 興 | 私 |
| 田 | 止 | 使 | 好 | 講 | 姿 |
| 土 | 市 | 始 | 候 | 混 | 視 |
| 二 | 矢 | 指 | 航 | 査 | 詞 |
| 日 | 姉 | 歯 | 康 | 再 | 誌 |
| 入 | 思 | 詩 | 告 | 災 | 磁 |
| 年 | 紙 | 次 | 差 | 裏 | 射 |
| 白 | 寺 | 事 | 菜 | 採 | 捨 |
| 八 | 自 | 持 | 最 | 際 | 尺 |
| 百 | 時 | 式 | 材 | 在 | 若 |
| 文 | 室 | 実 | 昨 | 財 | 樹 |
| 木 | 社 | 写 | 札 | 罪 | 収 |
| 本 | 弱 | 者 | 刷 | 雑 | 宗 |
| 名 | 首 | 主 | 殺 | 酸 | 就 |
| 目 | 秋 | 守 | 察 | 賛 | 衆 |
| 立 | 週 | 取 | 参 | 支 | 従 |
| 力 | 春 | 酒 | 産 | 志 | 縦 |
| 林 | 書 | 受 | 散 | 枝 | 縮 |
| 六 | 少 | 州 | 残 | 師 | 熟 |
|   | 場 | 拾 | 士 | 資 | 純 |
|   | 色 | 終 | 氏 | 飼 | 処 |
|   | 食 | 習 | 史 | 示 | 署 |

FIG. 9B₂

| | | | | | |
|---|---|---|---|---|---|
| | 心 | 集 | 司 | 似 | 諸 |
| | 新 | 住 | 試 | 識 | 除 |
| | 親 | 重 | 児 | 質 | 将 |
| | 図 | 宿 | 治 | 舎 | 傷 |
| | 数 | 所 | 辞 | 謝 | 障 |
| | 西 | 暑 | 失 | 授 | 城 |
| | 声 | 助 | 借 | 修 | 蒸 |
| | 星 | 昭 | 種 | 述 | 針 |
| | 晴 | 消 | 周 | 術 | 仁 |
| | 切 | 商 | 祝 | 準 | 垂 |
| | 雪 | 章 | 順 | 序 | 推 |
| | 船 | 勝 | 初 | 招 | 寸 |
| | 線 | 乗 | 松 | 承 | 盛 |
| | 前 | 植 | 笑 | 証 | 聖 |
| | 組 | 申 | 唱 | 条 | 誠 |
| | 走 | 身 | 焼 | 状 | 宣 |
| | 多 | 神 | 象 | 常 | 専 |
| | 太 | 真 | 照 | 情 | 泉 |
| | 体 | 深 | 賞 | 織 | 洗 |
| | 台 | 進 | 臣 | 職 | 染 |
| | 地 | 世 | 信 | 制 | 善 |
| | 池 | 整 | 成 | 性 | 奏 |
| | 知 | 昔 | 省 | 政 | 窓 |
| | 茶 | 全 | 清 | 勢 | 創 |
| | 昼 | 相 | 静 | 精 | 装 |
| | 長 | 送 | 席 | 製 | 層 |
| | 鳥 | 想 | 積 | 税 | 操 |
| | 朝 | 息 | 折 | 責 | 蔵 |
| | 直 | 速 | 節 | 績 | 臓 |
| | 通 | 族 | 説 | 接 | 存 |
| | 弟 | 他 | 浅 | 設 | 尊 |
| | 店 | 打 | 戦 | 舌 | 宅 |
| | 点 | 対 | 選 | 絶 | 担 |
| | 電 | 待 | 然 | 銭 | 探 |
| | 刀 | 代 | 争 | 祖 | 誕 |
| | 冬 | 第 | 倉 | 素 | 段 |
| | 当 | 題 | 巣 | 総 | 暖 |
| | 東 | 炭 | 束 | 造 | 値 |
| | 答 | 短 | 側 | 像 | 宙 |
| | 頭 | 談 | 続 | 増 | 忠 |
| | 同 | 着 | 卒 | 則 | 著 |
| | 道 | 注 | 孫 | 測 | 庁 |

| | | | | | |
|---|---|---|---|---|---|
| | 読 | 柱 | 帯 | 属 | 頂 |
| | 内 | 丁 | 隊 | 率 | 潮 |
| | 南 | 帳 | 達 | 損 | 賃 |
| | 肉 | 調 | 単 | 退 | 痛 |
| | 馬 | 追 | 置 | 貸 | 展 |
| | 売 | 定 | 仲 | 態 | 討 |
| | 買 | 庭 | 貯 | 団 | 党 |
| | 麦 | 笛 | 兆 | 断 | 糖 |
| | 半 | 鉄 | 腸 | 築 | 届 |
| | 番 | 転 | 低 | 張 | 難 |
| | 父 | 都 | 底 | 提 | 乳 |
| | 風 | 度 | 停 | 程 | 認 |
| | 分 | 投 | 的 | 適 | 納 |
| | 聞 | 豆 | 典 | 敵 | 脳 |
| | 米 | 島 | 伝 | 統 | 派 |
| | 歩 | 湯 | 徒 | 銅 | 拝 |
| | 母 | 登 | 努 | 導 | 背 |
| | 方 | 等 | 灯 | 徳 | 肺 |
| | 北 | 動 | 堂 | 独 | 俳 |
| | 毎 | 童 | 働 | 任 | 班 |
| | 妹 | 農 | 特 | 燃 | 晩 |
| | 万 | 波 | 得 | 能 | 否 |
| | 明 | 配 | 毒 | 破 | 批 |
| | 鳴 | 倍 | 熱 | 犯 | 秘 |
| | 毛 | 箱 | 念 | 判 | 腹 |
| | 門 | 畑 | 敗 | 版 | 奮 |
| | 夜 | 発 | 梅 | 比 | 並 |
| | 野 | 反 | 博 | 肥 | 陛 |
| | 友 | 坂 | 飯 | 非 | 閉 |
| | 用 | 板 | 飛 | 備 | 片 |
| | 曜 | 皮 | 費 | 俵 | 補 |
| | 来 | 悲 | 必 | 評 | 暮 |
| | 里 | 美 | 票 | 貧 | 宝 |
| | 理 | 鼻 | 標 | 布 | 訪 |
| | 話 | 筆 | 不 | 婦 | 亡 |
| | | 氷 | 夫 | 富 | 忘 |
| | | 表 | 付 | 武 | 棒 |
| | | 秒 | 府 | 復 | 枚 |
| | | 病 | 副 | 複 | 幕 |
| | | 品 | 粉 | 仏 | 密 |
| | | 負 | 兵 | 編 | 盟 |
| | | 部 | 別 | 弁 | 模 |

|  |  |  |  |  |  |
|---|---|---|---|---|---|
|  |  | 服 | 辺 | 保 | 訳 |
|  |  | 福 | 変 | 墓 | 郵 |
|  |  | 物 | 便 | 報 | 優 |
|  |  | 平 | 包 | 豊 | 幼 |
|  |  | 返 | 法 | 防 | 欲 |
|  |  | 勉 | 望 | 貿 | 翌 |
|  |  | 放 | 牧 | 暴 | 乱 |
|  |  | 味 | 末 | 務 | 卵 |
|  |  | 命 | 満 | 夢 | 覧 |
|  |  | 面 | 未 | 迷 | 裏 |
|  |  | 問 | 脈 | 綿 | 律 |
|  |  | 役 | 民 | 輸 | 臨 |
|  |  | 薬 | 無 | 余 | 朗 |
|  |  | 由 | 約 | 預 | 論 |
|  |  | 油 | 勇 | 容 |  |
|  |  | 有 | 要 | 略 |  |
|  |  | 遊 | 養 | 留 |  |
|  |  | 予 | 浴 | 領 |  |
|  |  | 羊 | 利 |  |  |
|  |  | 洋 | 陸 |  |  |
|  |  | 葉 | 良 |  |  |
|  |  | 陽 | 料 |  |  |
|  |  | 様 | 量 |  |  |
|  |  | 落 | 輪 |  |  |
|  |  | 流 | 類 |  |  |
|  |  | 旅 | 令 |  |  |
|  |  | 両 | 冷 |  |  |
|  |  | 緑 | 例 |  |  |
|  |  | 礼 | 歴 |  |  |
|  |  | 列 | 連 |  |  |
|  |  | 練 | 老 |  |  |
|  |  | 路 | 労 |  |  |
|  |  | 和 | 録 |  |  |
|  |  |  | 和 |  |  |

FIG. 9B$_5$

SYSTEM AND METHOD FOR LOCALIZING ASSETS USING FLEXIBLE METADATA

CROSS-REFERENCE TO RELATED APPLICATIONS

This application claims the benefit under 35 U.S.C. 119(e) of U.S. Provisional Application No. 60/982,701 filed on Oct. 25, 2007, which is incorporated by reference in its entirety.

This application is related to the following applications: (1) U.S. application Ser. No. 12/020075, titled SYSTEM AND METHOD FOR LOCALIZING ASSETS USING AUTOMATIC GENERATION OF ALERTS (2) U.S. patent application Ser. No. 12/020021, titled SYSTEM AND METHOD FOR LOCALIZING ASSETS USING TEXT SUBSTITUTIONS; and (3) U.S. patent application Ser. No. 12/020113, titled SYSTEM AND METHOD FOR LOCALIZING ASSETS USING DICTIONARY FILE BUILD, all of which were filed on Jan. 25, 2008 and are hereby incorporated by reference in their entireties.

BACKGROUND OF THE INVENTION

1. Field of the Invention

The invention relates to video game development, and in particular, to an automated management of localization workflow.

2. Description of the Related Technology

A video game can be developed in one country using a single natural language, such as English, but the video game may be distributed in many different countries in which foreign languages are spoken. Accordingly, various assets, e.g., text, audio, and video, of the game need to be translated into the foreign languages. The process of translation is referred to as localization. Various assets that need to be localized are identified and sent to applicable translators. After the translations are performed, they should be reviewed for accuracy and, when applicable, for compliance with various standards for different platforms. As such, video game localization is an expensive and complicated part of video game development.

In addition, a translator typically is not provided with the privileges to compile source code. In a conventional game development process, to view updates to translations in a game environment, a translator may have to wait for the source code to be recompiled by the software developer, which may be in a different time zone from the translator. This can result in lengthy delays.

Therefore, an automated management of localization workflow for video game development would be desirable.

SUMMARY OF THE INVENTION

The system, method, and devices of the invention each have several aspects, no single one of which is solely responsible for its desirable attributes. Without limiting the scope of this invention as expressed by the claims which follow, its more prominent features will now be discussed briefly.

In one embodiment, there is a computer-implemented method for managing localization workflow for a video game development, wherein the method includes determining that a string needs to be translated; associating a translator with the string; and providing video metadata to the translator, wherein the video metadata includes at least video information from game play of the video game being developed such that the translator is provided with context for the translation.

In another embodiment, there is an apparatus for managing localization workflow for video game development, wherein the apparatus includes an apparatus configured to determine that a string needs to be translated; and an apparatus configured to provide video metadata to a translator associated with the string to be translated, wherein the video metadata includes at least video information from the video game being developed, and provides the translator with context for the translation.

In another embodiment, there is a computer-implemented method for managing localization workflow for a video game development, wherein the method includes determining that a string needs to be translated; and providing metadata to a translator associated with a string to be translated, wherein the metadata comprises a text message indicating a maximum number of pixels for a translated string, wherein the maximum number of pixels is determined at least partly based on a number pixels that can fit inside a text box of a given size.

In another embodiment, there is an apparatus for managing localization workflow for video game development, wherein the apparatus includes a module configured to determine that a string needs to be translated; and a module configured to provide metadata to a translator associated with a string to be translated, wherein the metadata comprises a text message indicating a maximum number of pixels for a translated string, wherein the maximum number of pixels is determined at least partly based on a number pixels that can fit inside a text box of a given size.

In another embodiment, there is a computer-implemented method for managing localization workflow for a video game development, wherein the method includes determining that a string needs to be translated; and providing metadata to a translator associated with a string to be translated, wherein the metadata comprises an embedded program, wherein the embedded program programmatically limits the length of the translated string before the translated string can be imported into an electronic file configured to store the translated string.

BRIEF DESCRIPTION OF THE DRAWINGS

These drawings and the associated description herein are provided to illustrate specific embodiments of the invention and are not intended to be limiting.

FIG. 3C is a screen shot illustrating an example of flexible metadata according to one embodiment.

FIG. 7B illustrates a screenshot of a user interface for a software developer to select an identifier for an appropriate phrase, symbol, game button, or the like.

DETAILED DESCRIPTION OF CERTAIN INVENTIVE EMBODIMENTS

Although particular embodiments are described herein, other embodiments of the invention, including embodiments that do not provide all of the benefits and features set forth herein, will be apparent to those of ordinary skill in the art.

Embodiments include systems and methods of localizing assets for video games will be described. Video games may include, but are not limited to, video games played on proprietary game consoles, such as Sony® Playstation®, Playstation® 2 (PS2), Playstation® 3 (PS3), Nintendo® GameCube®, Nintendo® Wii®, Microsoft® Xbox®, Microsoft® Xbox® 360, computer games for personal computers (PCs), and games played on the Internet. In particular, various embodiments representing novel automated management of localization workflow in a video game development system will be described.

Figure 1:
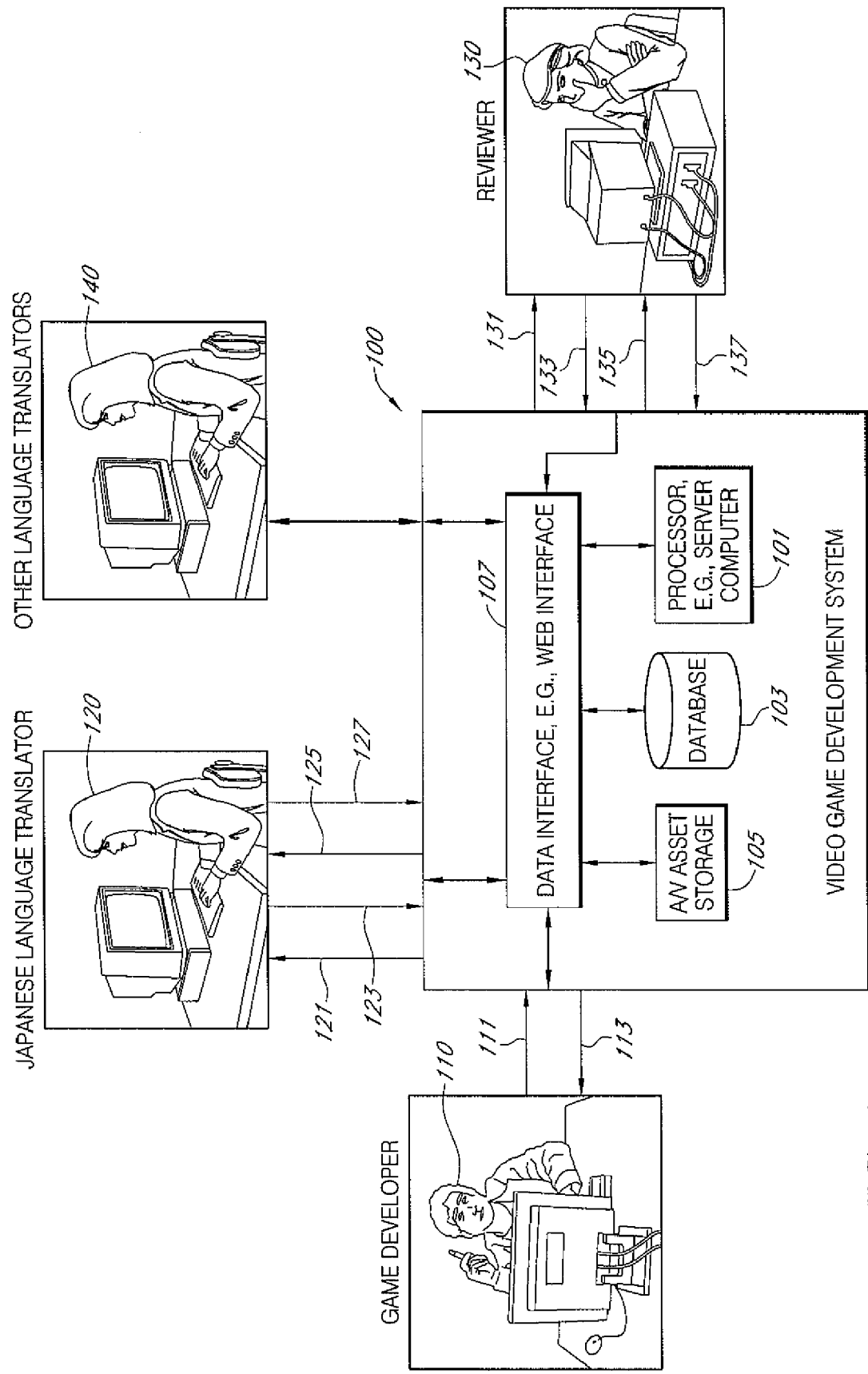
FIG. 1 illustrates a data flow diagram of the video game development system having an automated localization workflow management according to one embodiment.

FIG. 1 illustrates a data flow diagram of the video game development system having an automated localization workflow management according to one embodiment. The system 100 includes a processor 101, a database 103, an audio/video (A/V) asset storage 105, and a data interface 107. In one embodiment, the processor 101 is embodied in a server computer configured to run the development application and interact with the data interface 103 to allow users, e.g., a game developer 110, a translator 120, and a reviewer 130, to retrieve and upload data from and to the database 103 and the A/V asset storage 105. Some of these users, such as a project manager and a reviewer, may be employees of the entity that controls the game development system, or outside users such as game developers or translators in foreign countries who are permitted to log into the game development system 100 to work on particular projects, but are not employees of the entity that controls the system. Each of the users shown in FIG. 1—the game developer 110, the translator 120, and the reviewer 130—may be an employee user or an outside user in a particular project. In one embodiment, the processor 101 is a server computer programmed with structure query language (SQL) to create, modify, and access the database 103.

The database 103 contains a global set of tables that contain information shared by projects. These tables can include user information, line types, languages, platforms, and certification legal text. Each project may have its own its own subset of tables (prefixed with the short name of the project) that are project specific. The project manager can decide which tables are needed as well as the structure of each table (filed names and data type definitions). The A/V asset storage 105 is a high-volume data storage device for storing such memory-intensive assets such as audio and video assets. The data interface 107 allows the inside and outside users to enter and retrieve data from the database 103. Users can upload files (EXCEL, audio assets, video assets, and art assets) for storage in the SQL server itself 101, the database 103, or the audio/video asset storage 105. Furthermore the users will be able to download the latest dictionary files built by the SQL server. In certain embodiments, the data interface 107 includes a Web interface. For example, in certain embodiments, the database 103 is at one location, e.g., Glendale, Calif., while the server computer 101 is at a different location, e.g., Salt Lake City, Utah; and the server computer accesses the database via a wide area network (WAN), such as the Internet using the Web interface. In other embodiments, the database and the server computer are located in the same location; and the server computer accesses the database via a local area network (LAN). In yet other embodiments, the database is located within the server computer itself, e.g., in the hard disk.

In operation, the game developer 110 makes a change to text in a video game asset by adding or modifying a string contained within the text as illustrate by arrow 111. The processor 101 is configured to automatically detect the change and generate a localization alert report via an electronic message, e.g., an e-mail or an instant message or the like, to an applicable translator 120, e.g., a Japanese translator, as illustrated by arrow 121. The localization alert report is intended to notify the applicable translator 120 that the text needs to be translated or localized. Depending on the countries targeted for the game, the system may generate other localization alert reports for other language translators 140. After seeing the localization alert report, the translator 110 logs into the system 100, as illustrated by arrow 123, and retrieves the string or text to be translated and any metadata associated with the string or text as illustrated by arrow 125. Metadata can include any information, e.g., notes, messages, and line restrictions, intended to aid the translator and/or the reviewer to understand the context and properly localize the string. In certain embodiments, the string to be localized and the metadata are stored in an Excel file and downloaded by the translator. After localization, the translator 120 uploads the Excel file containing the localized string to the system, as illustrated by arrow 127. In other embodiments, the translator may directly access the string in the database from his or her computer and directly enter the translated string into the database without the downloading and the uploading the Excel file as described above.

In certain embodiments, the processor 101 is further configured to automatically detect the newly entered localized string and generate a review alert report via e.g., an email or an instant message, to an applicable reviewer 130 for the localized string, as illustrated by arrow 131. The review alert report is intended to notify the reviewer that the string has been localized and is waiting an approval. After seeing the review alert report, the reviewer 120 logs into the system 100, as illustrated by arrow 133, and retrieves the localized string and any included metadata, as illustrated by arrow 135. After retrieving the localized string, the review may run the game by building a dictionary file that includes the new localized string. After reviewing the localization, the reviewer 130 either approves or rejects the localized string, as illustrated by arrow 137. If the localized string is rejected by the reviewer, another automatic localization alert report may be generated to notify the translator of the rejection of the localized string.

The report also may include reasons for the rejection. The translator may then re-translate the string and add the re-translated string to the project, thereby generating another automatic review alert report for the reviewer. In addition, reviewers can change or correct a translation. In one embodiment, the translation from a reviewer is not subject to farther review.

Figure 2A:
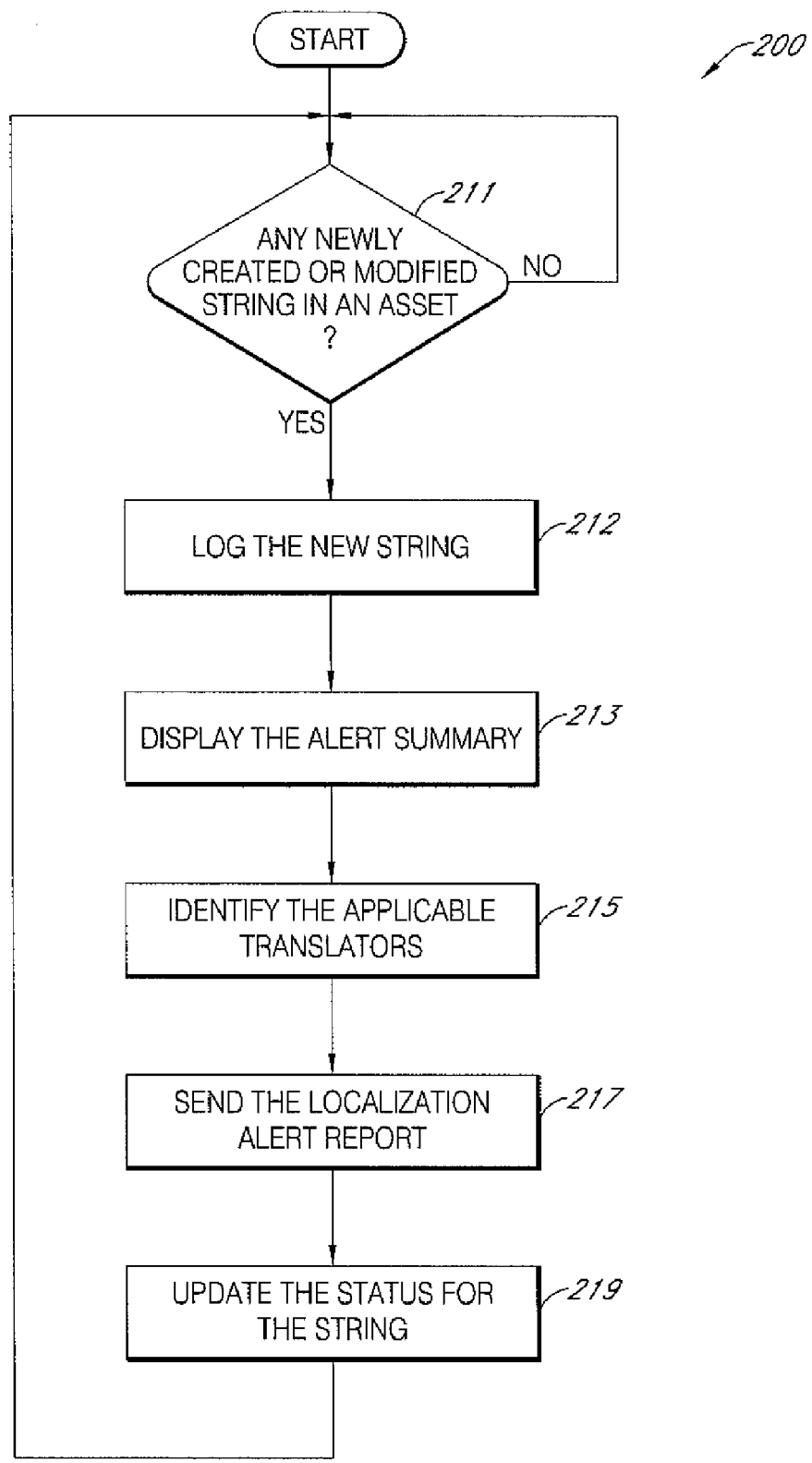
FIG. 2A is a flowchart illustrating an example process for the automatic localization alert generation to a translator according to one embodiment.
Figure 2B:
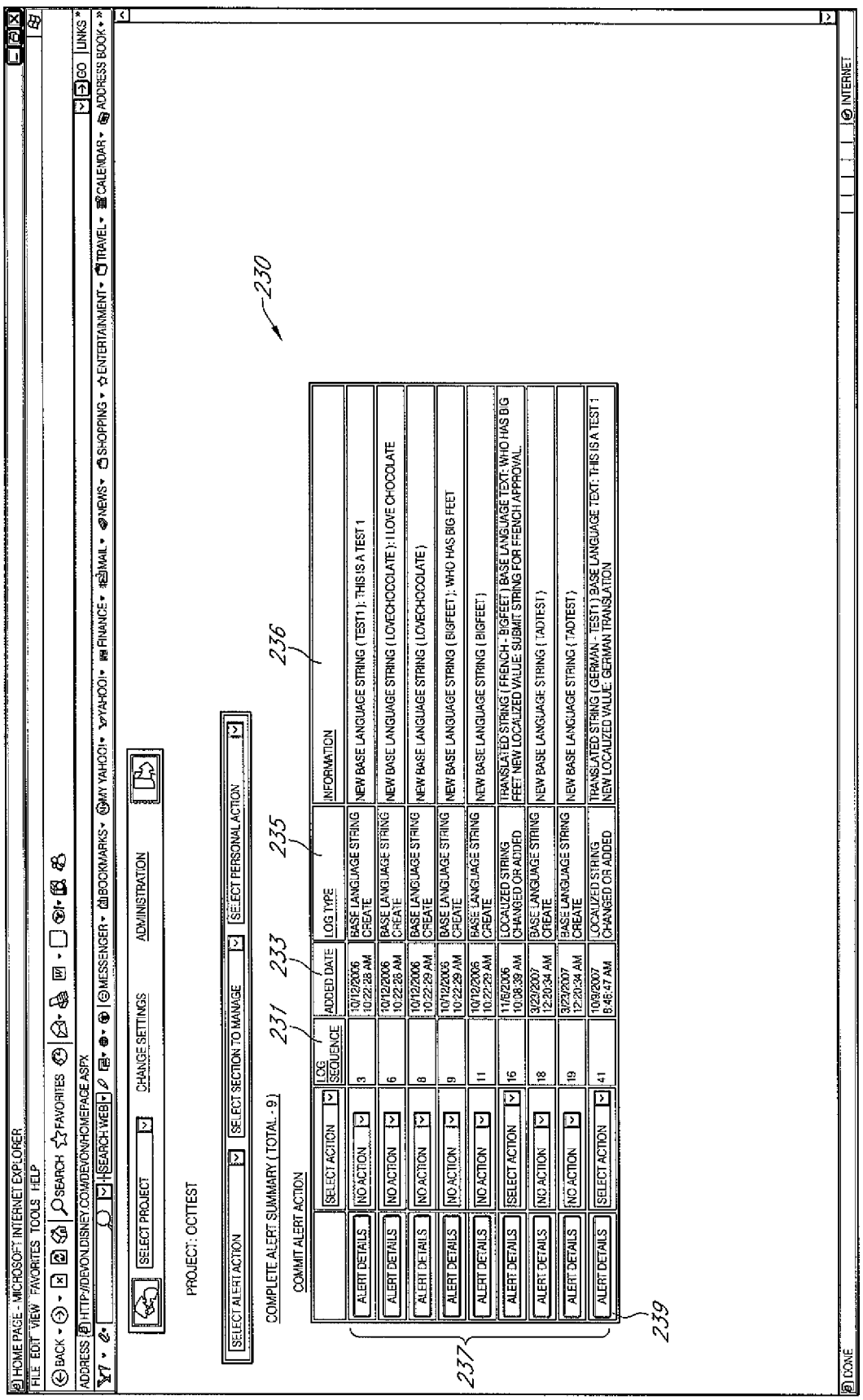
FIG. 2B is a screen shot illustrating an example of an alert summary including a new alert caused by an addition of a string according to one embodiment.
Figure 2C:
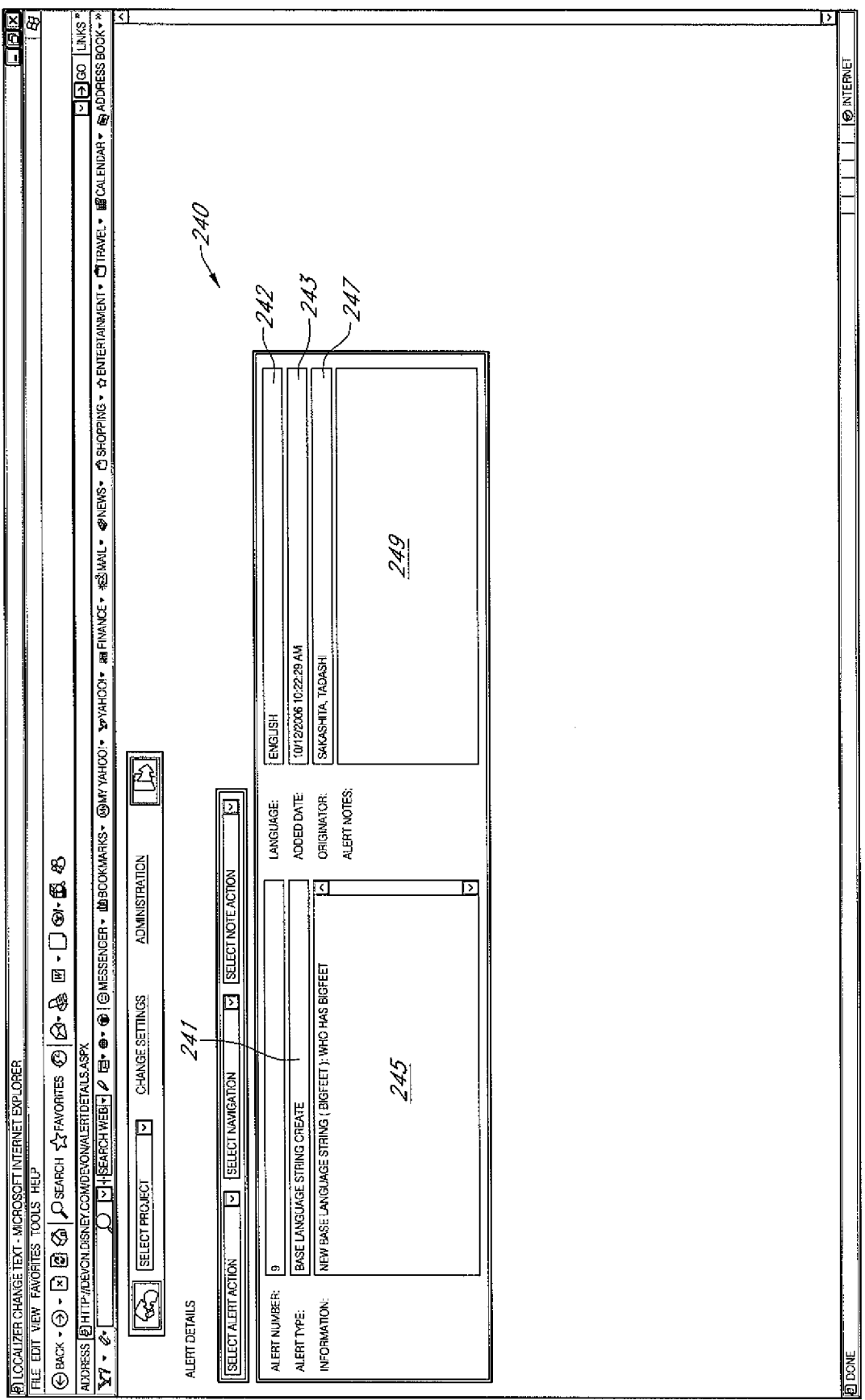
FIG. 2C is a screen shot illustrating an example of an automatically generated localization alert report according to one embodiment.

Automatic Alert Generation
Generating a Localization Alert After a Creation or Modification of a String FIG. 2A is a flowchart illustrating an example process for the automatic localization alert generation to a translator according to one embodiment. The process 200 starts at a state 211, where it is determined whether a string has been newly added to or modified in an executable asset of a video game being developed. This determination also includes inspection of the string to determine whether the string is to be presented, e.g., visually displayed or audibly played, during game play. If the answer is NO, the process loops back to the state 211. If the answer is YES, the process moves to a state 212, where the string is first stored in a queue and then logged into the database 103 (such as shown in FIG. 1). The process then moves to a state 213, where an alert summary, such as shown in FIG. 2B, is made available to a user, e.g., the game developer 110, for display. The process then moves to a state 215, where applicable translators—those translators in targeted languages who are associated with the string—are identified. The process then moves to a state 217, where alert reports, such as one shown in FIG. 2C, are sent, via, e.g., e-mails or instant messages, to the applicable translators. The process then moves to a state 219, where the logged entry for the string in the database is updated to indicate that the alert reports for the string have been generated and sent to the applicable translators.

FIG. 2B is a screen shot illustrating an example of an alert summary including a new alert caused by an addition of a string according to one embodiment. In the example embodiment, the alert summary 240 is presented in a table format comprising rows of translation entries and columns of different types of data for the entries. The rows include logged entries 237 including a new entry 239. The columns include a Log Sequence column 231, an Added Date column 233, a Log Type column 235, and an Information column 236. The Log Sequence column 231 includes a sequence of numbers indicating the order by which the translation entries are logged into the database. The Added Date column 233 includes date and time stamps for different entries. The Log Type column 235 indicates developer actions that caused the alert generations for different entries. The possible developer actions include an addition or modification of a new string ("Base language string create") and a localization of a string by a translator ("Localized string changed or added"). The Information column 236 lists details of the actions causing the alerts, such as the new string ("who has big feet") that has been added.

FIG. 2C is a screen shot illustrating an example of an automatically generated localization alert report according to one embodiment. The localization alert report is intended to notify a translator that a string needs to be localized. The localization alert report 240 includes: an Alert Type field 241 indicating the type of actions that caused the alert generation, e.g., an addition or creation of a string ("Base language string create"); a Language field 242 indicating the base language of the string; an Added Time filed 243 indicating the time when the string to be localized was added; an Information field 245 indicating the particular string to be localized ("who has big feet"); an Originator field 247 indicating the person or entity, e.g., a game developer, that created or modified the string; and an Alert Notes field 249 indicating special notes or messages to the translator. The Alert Notes field is one example of metadata that may be associated with the string to help or guide a translator to properly localize the string. The metadata will be discussed below with reference to FIGS. 4A and 4B. As discussed above with reference to FIG. 2A, in certain embodiments, the localization alert report 240 is sent to the applicable translator in the form of an e-mail or an instant message.

Generating a Review Alert after Localization of a String

Figure 3A:
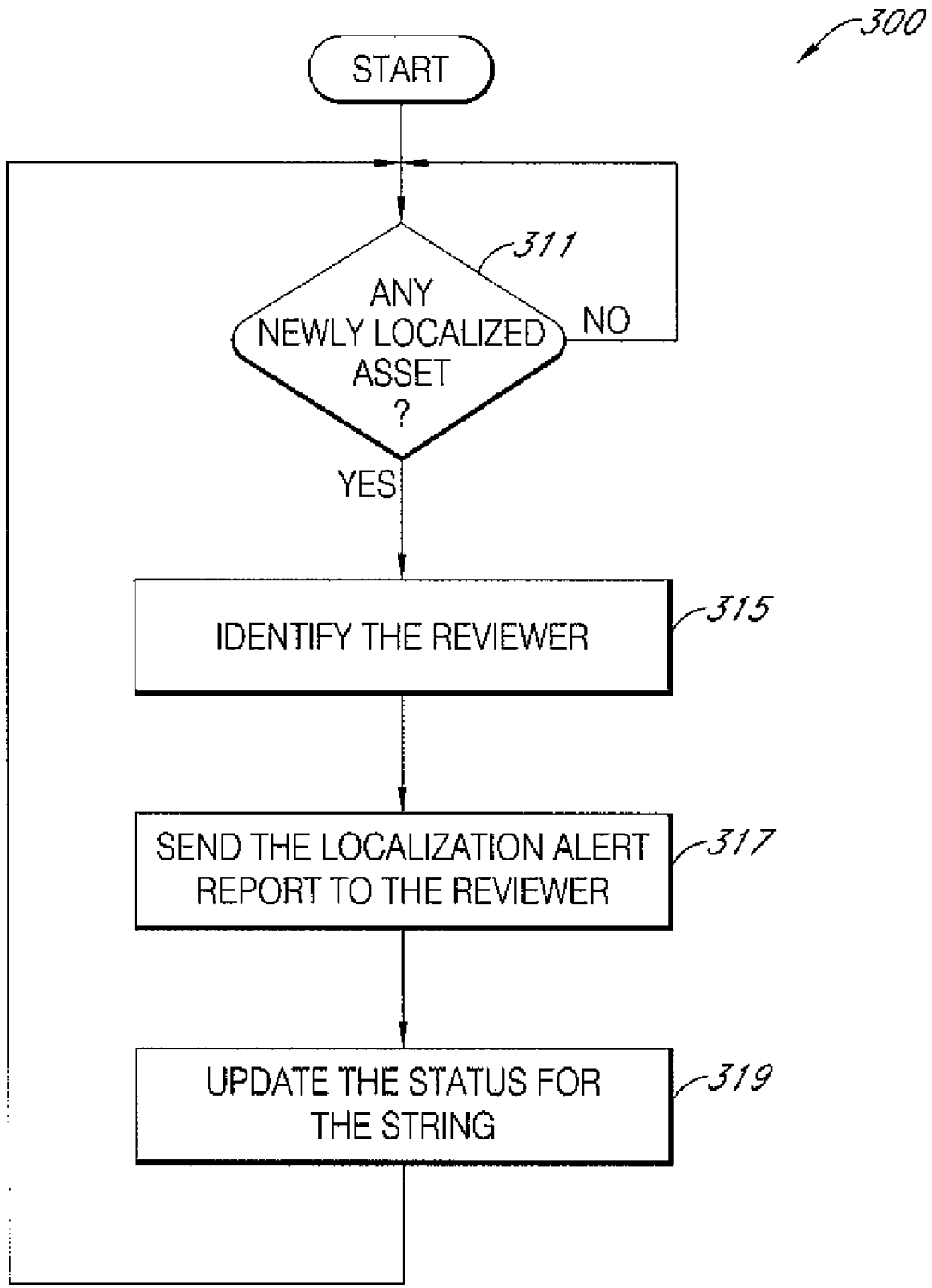
FIG. 3A is a flowchart illustrating an example process for the automatic review alert generation to according to one embodiment.
Figure 3B:
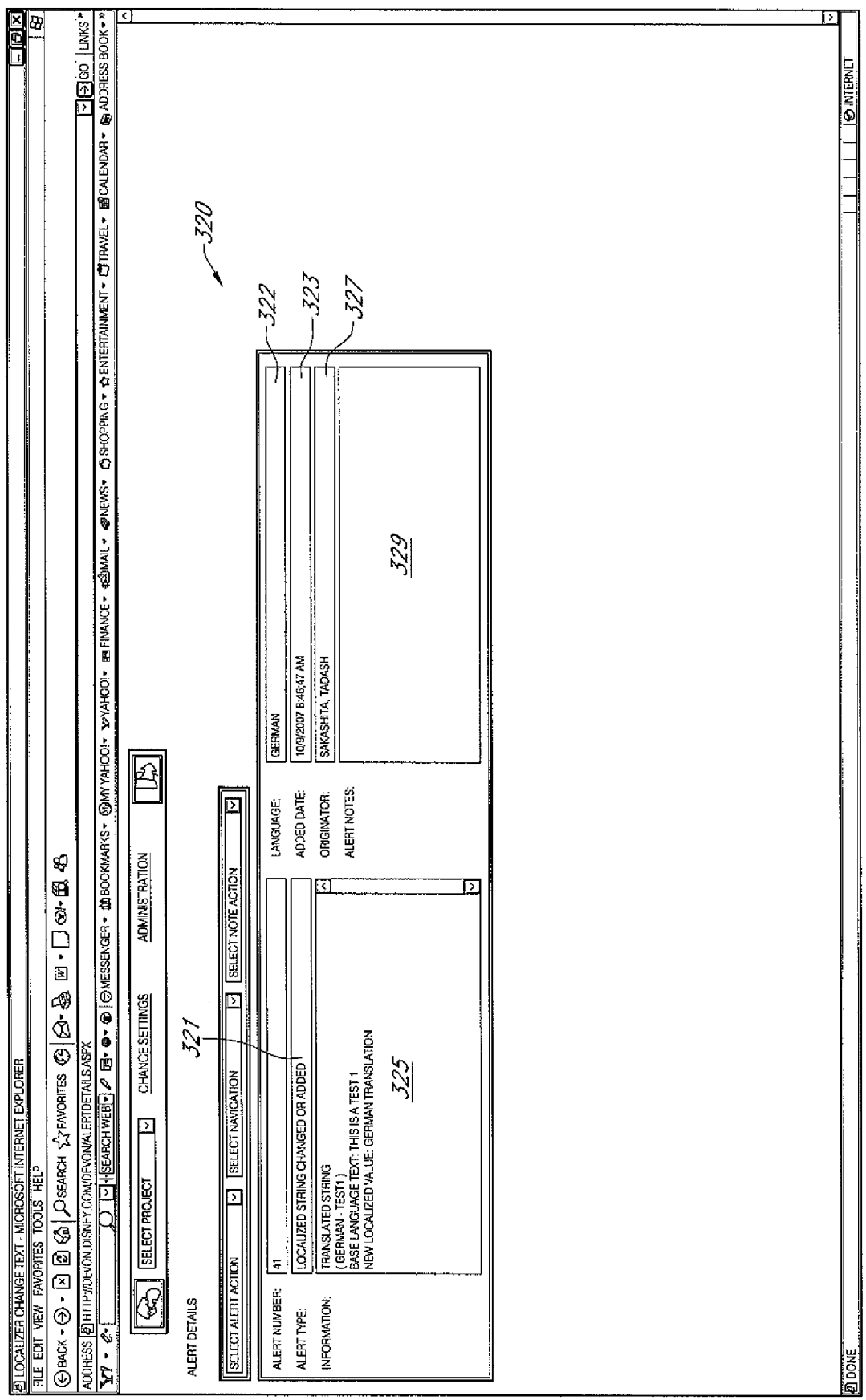
FIG. 3B is a screen shot illustrating an example of an automatically generated review alert report according to one embodiment.

FIG. 3A is a flowchart illustrating an example process 300 for the automatic review alert generation to according to one embodiment. The review alert report is intended to notify a reviewer that a localized string is waiting for an approval. The process 300 starts at a state 311, where it is determined whether the newly added/created or modified string has been translated to a localized string by the translator. If the answer is NO, the process loops back to the state 311. If the answer is YES, the process moves to a state 315, where an applicable reviewer—the reviewer who is associated with the language and the particular string—is identified. The process then moves to a state 317, where a review alert report, such as the one shown in FIG. 3B, is sent, via, e.g., e-mails or instant messages, to the applicable reviewer. The process then moves to a state 319, where the logged translation entry in the database is updated to indicate that the review alert report has been sent.

FIG. 3B is a screen shot illustrating an example of an automatically generated review alert report according to one embodiment. The review alert report 320 includes: an Alert Type field 321 indicating the type of actions that caused the review alert generation, e.g., addition or entry of a localized string by a translator ("Localization string changed or added"); a Language field 322 indicating the localized language; an Added Time filed 323 indicating the time when the localized string was entered or added; an Information field 325 including the localized string; an Originator field indicating the person or entity, e.g., the translator, who localized string; and an Alert Notes field 429 including special notes or messages containing context information intended to be used to the translator and/or the reviewer. Even if the notes are mainly directed to the translator, the notes may nevertheless be helpful to the reviewer in determining whether the translation was done properly. In certain embodiments, as with the localization alert report discussed above, the review alert report 320 may be sent to the reviewer via an electronic message, e.g., an e-mail or an instant message or the like.

Flexible Metadata and Text Length Limitation

Figure 3C:
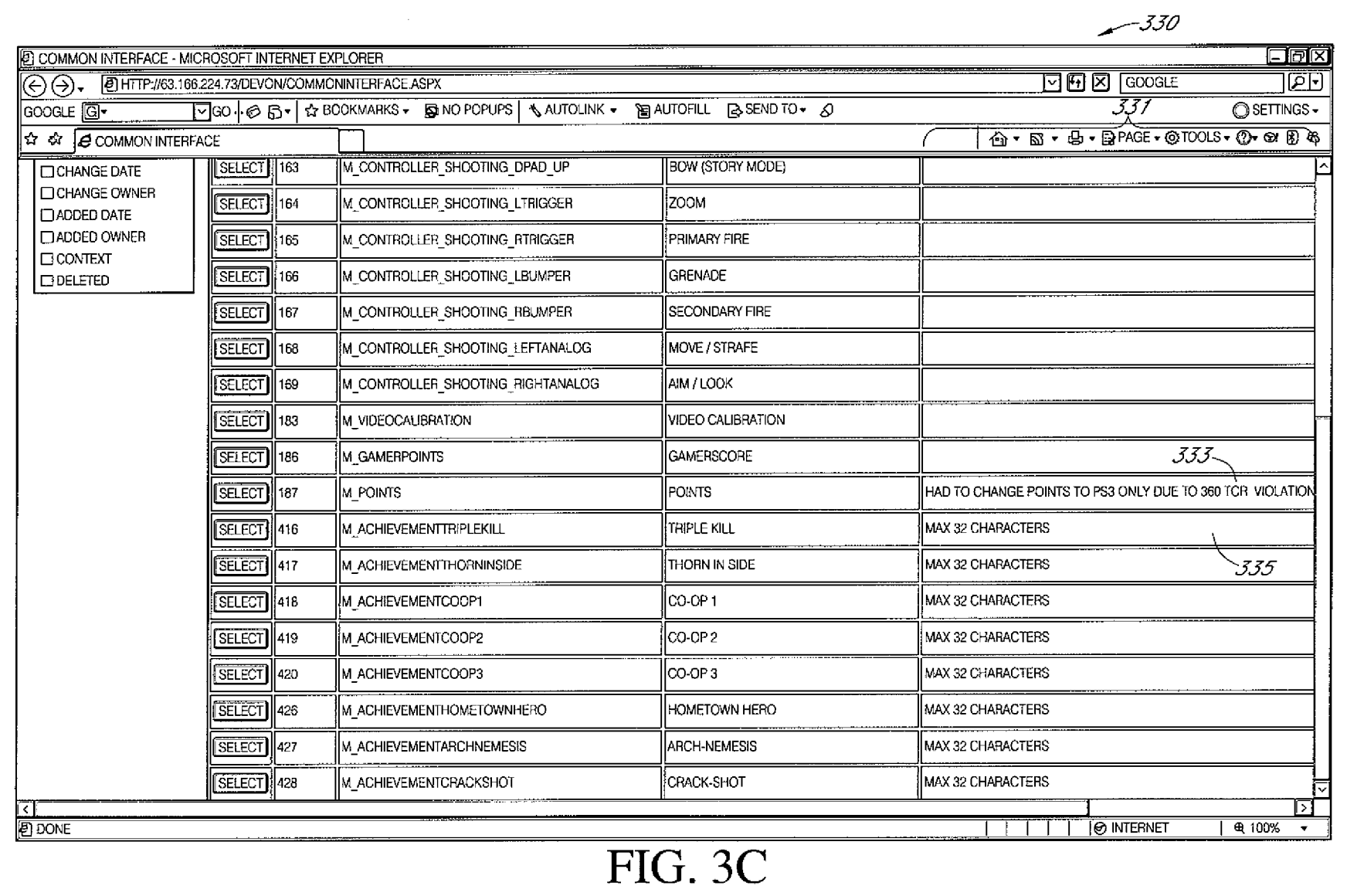

FIG. 3C is a screen shot illustrating an example of flexible metadata according to one embodiment. Metadata include any information that can affect translation or will aid translators. Metadata include information generated by the game developer and intended to be used by the translator; and also information generated by the translator or the game developer and intended to be used by the reviewer. Metadata may include different data types and content types. The data types include text, audio, image, and video data. The content types include notes, context, line type information (e.g., web site navigation, controller pulls), line length restrictions, speaking character, target character(s), and proper usage. For example, the metadata may include a short video clip showing the face and gesture of a character who is uttering the text, thereby providing the translator with context such as the mood of the character. Different localization tasks may use different sets of metadata. Therefore, a developer on a particular localization project may determine his or her own requirements for localization and include a different set of metadata having different data types and content types. Returning to FIG. 3C, the metadata column 331 includes a text message 333 explaining why, for example a particular localization choice was made. The metadata informs the translator and/or reviewer how to properly make the translation. The illustrated example relates to a certification requirement from a console vendor (Sony). The metadata column further includes a text message 335 indicating the maximum characters allowed for the translated string. This is one example of use of metadata to limit the length of the translated string. In certain other embodiments, the text message or notes may indicate that the length of the translation should be limited so that, for example, the text containing the localized string can fit inside a text box of a given size. In some embodiments, the game development system may programmatically calculate the length of the translation in terms of numbers of characters for the localized string. In some other embodiments, the system may programmatically calculate the length of the translation in terms of numbers of pixels for the localized string. The pixel method may provide a more accurate measure of whether the translated string may fit inside a box than the character number method because different translated characters in proportional fonts, for example, may have different pixel counts (e.g., "I" vs. "M"). Usually the text box size does not change (for cost purposes), but some languages, e.g., German, use lengthy text so the code may be adjusted for that language.

Alternatively, the metadata may include an embedded program that programmatically limits the length of the translated string such that the program automatically rejects a translation that exceeds the length requirement and displays a message indicating the reason for the rejection. For example, when the translated text is entered and submitted to be stored in the database, an embedded program, e.g., a JavaScript program, checks the length of the string to be inserted. If the length is too long, the string will not be inserted and an error message will be displayed. In one such embodiment, the embedded program checks each line during an import from Excel file uploaded by the translator to make sure that length requirements are met. In yet other embodiments, the embedded program may programmatically limit the length of the translated string such that the translated text containing the translated string may fit inside a text box of a given size. In yet other embodiments, the metadata may include a series of conversations between two characters that provide the context for the string to be translated as shown by the screen shot 340 in FIG. 3D. For example, the metadata can include who is speaking and what section of the game is applicable. In another example, the metadata can specify that the voice should be processed so that it sounds like it was spoken in a large room.

Substitutions

The illustrated techniques are typically embodied in software that is executed by a computer. The functions of disclosed systems can be distributed across multiple computer systems and servers. Software developers typically develop code using a variety of editors, such as text editors or the like, and source code is typically stored in a server. After the source code has been developed to a sufficient level, translators and reviewers can begin work on translations. Typically, translators and reviewers can use a browser to look at text to be translated or to enter translated text. A browser is an application, which can locate and display Web pages. Examples of browsers include Microsoft® Internet Explorer and Mozilla® Firefox®. The user computer of a translator can download text to be translated and upload translated text via the browser by communicating with the game development system via, for example, a wide area network such as the Internet.

Figure 4:
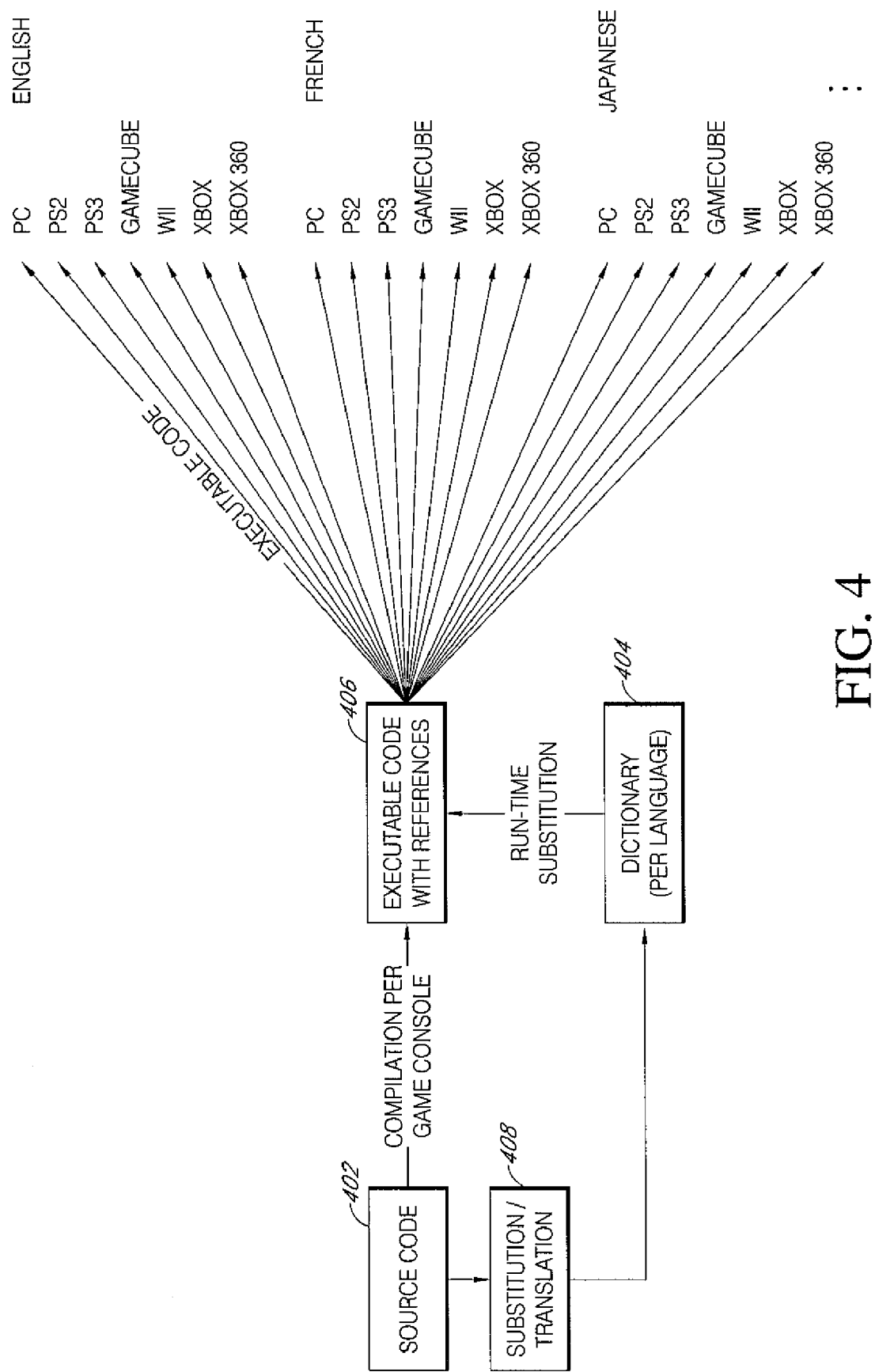
FIG. 4 illustrates an overview of the complexity involved with preparing a video game for a plurality of natural languages and a plurality of game consoles.

FIG. 4 illustrates an overview of the complexity involved with preparing a video game for a plurality of natural languages and a plurality of game consoles. In one embodiment, the software developer's language is English. Typically, text for Windows to be displayed or words to be spoken are written during game development in the same natural language. However, the game may ultimately be marketed to individuals who would prefer a different natural language, such as, but not limited to, Japanese, French, German, Spanish, Italian and the like.

It should be noted that a game intended for a particular console typically has executable code adapted for that particular console and for that particular console's game controllers. For example, the button configurations on game controllers can vary among the consoles. Examples of game consoles include the Sony® Playstation®, Playstation® 2 (PS2), Playstation® 3 (PS3), Nintendo® GameCube®, Nintendo® Wii®, Microsoft® Xbox®, Microsoft® Xbox® 360, and the like. A general purpose computer that runs a particular operating system is also considered a game console herein. For example, a computer running a Microsoft® Windows® XP operating system can be considered to be a game console, Notwithstanding a degree of backwards compatibility among related game consoles, for each variation of language and game console, a specifically adapted executable code is typically generated. This can be a daunting task.

Embodiments of the invention include a video game development system with workflow management to assist in the efficient development of video games. In one embodiment, the software developers generate source code 402, One or more dictionary files 404, which can be generated by translators, reviewers, compliance reviewers, software developers or the like, can include components of the game that vary among the different language versions. In one embodiment, there is a particular dictionary file 404 for each natural language and game console combination. When a game is being compiled, the source code 402 and the relevant dictionary file 404 are compiled to generate executable code 406. Typically, the executable code 406 varies by game console, but does not vary by language. However, certain languages such as German can take up more text space and the source code 402 and the executable code 406 can be adjusted to accommodate larger size text boxes. Substitution and/or translation processes 408 are used to generate the one or more dictionary files 404. In one embodiment, the executable code 406 does not have the data to populate text boxes and the like, and rather, the executable code 406 contains references to the one or more dictionary files 404. A CPU of the game console during execution of the executable code 406 retrieves the appropriate text string and populates the text box during game play. This coding technique advantageously permits someone other than the software developer, such as translators and/or reviewers for quality assurance, to verify correct translation, fit of text within a text box, etc., without having to recompile or build the executable code 406. In one embodiment, the executable code 406 and the one or more dictionary files 404 are stored on the same optical disk.

For example, a software developer can generate source code 402 with identifiers for text to be displayed or spoken or for the display of symbols. The identifiers are used to associate the desired information within the dictionary file. The contents of the dictionary file can vary by language and by game console. For example, where a button symbol on a game controller and varies from game console to game console, the appropriate reference for the game console can be extracted from the one or more dictionary files 404.

In one embodiment, the dictionary files containing translated text and the like, are maintained separately from source code, which permit translators, reviewers, and the like to view changes and updates that they can make to a game without needing to have a software developer recompile the code. This can be a significant benefit as typically, a translator would not have privileges to modify and compile the source code itself. In addition, software developers and translators can be distributed across multiple time zones, so that waiting for a software developer to incorporate a change can result in a lengthy delay. When updated, the updated dictionary files are used during game execution. This permits the translators or reviewers to rapidly check translated text for compliance with style, size limitations, matching with context, or the like. Disclosed techniques efficiently manage workflow such that translation tasks and substitution tasks are efficiently performed. Substitution tasks will now be described as follows.

Exact Match Translation Substitution

Figure 5:
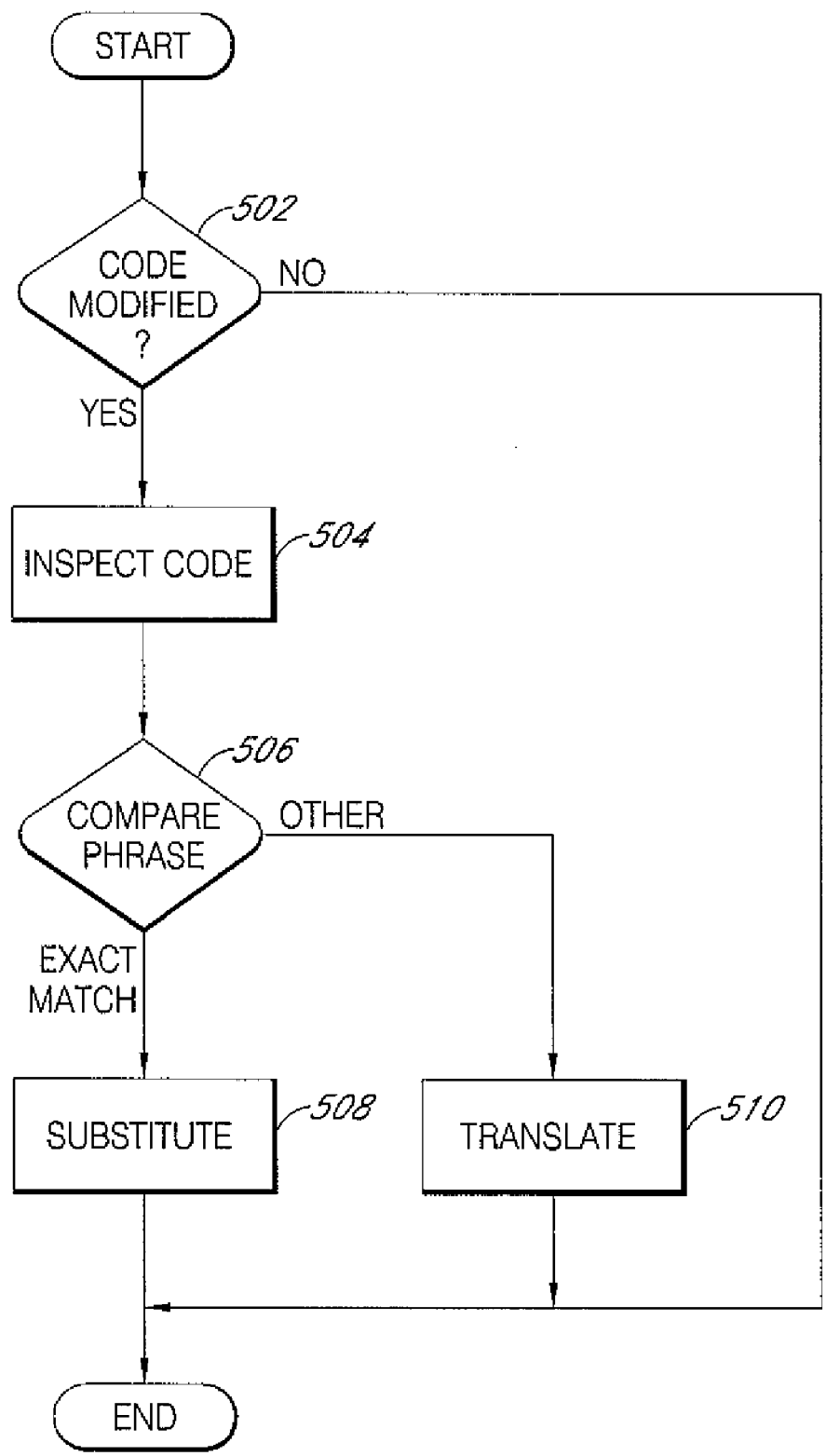
FIG. 5 illustrates a process that can be used to substitute an existing translation for a phrase.

FIG. 5 illustrates a process that can be used to substitute an existing translation for a phrase. For example, the process can be used in block 408 of FIG. 4. Before execution of the process, it is typically not known whether a translation already exists for a character string. Rather than send out the translation over again, which can risk translation errors, incur expense, and the like, a known good translation that already exists is substituted. In the illustrated embodiment, a substitute is used only when an exact match is found for the phrase (words and punctuation within the phrase). If an exact match is not found, the phrase should be translated because the meaning may be different. It will be appreciated by the skilled practitioner that the illustrated process can be modified in a variety of ways. For example, in another embodiment, various portions of the illustrated process can be combined, can be rearranged in an alternate sequence, can be removed, or the like.

The process begins by determining whether source code for a software module has been modified or created 502. The software module can be checked, for example, when the source code is being compiled. Typically, only new or modified software modules of source code are compiled because unchanged modules have up-to-date object files. The process can alternatively be invoked at other times to make use of new translation strings that may be available.

The code can be inspected 504 for character strings to be displayed in a text box during game play or for code corresponding to playback of spoken words. The words to be spoken can be indicated in remarks, i.e., not executable code, and a keyword or the like can be used to indicate that a words are to be uttered.

The entire phrase, including multiple words and punctuation, are compared 506 to a database of available translated phrase. The database can utilize, for example, relational database management system (RDBMS). In a RDBMS, the data is stored in the form of tables. Conceptually, the data within the table is stored within fields that are arranged into columns and rows. Each field contains one item of information. Each column within a table is identified by its column name and contains one type of information, such as the name of a natural language. A record, also known as a tuple, contains a collection of fields constituting a complete set of information. Typically, a record consists of one related row from each table, but a record can also comprise only one row from one table or groups of rows from several tables. In one system, the ordering of rows does not matter as the desired row can be identified by examination of the contents of the fields in at least one of the columns or a combination of fields.

When a match is found, the corresponding translated phrase is reused (substituted) 508 into the corresponding dictionary file(s), and the translated phrase is linked into the executable code by the linker. For example, for a particular language, the dictionary files for that language for the various game consoles can all be updated with the translated phrase. Otherwise, if no exact match is available for that particular language, then the phrase can be sent out for translating 510, for example, as described earlier in connection with FIGS. 1, 2A, 2B, and 2C. The process can be repeated as desired. For example, the process can be repeated on a daily basis as new translations are added to a database and become available to other projects.

Automatic Substitution

Figure 6:
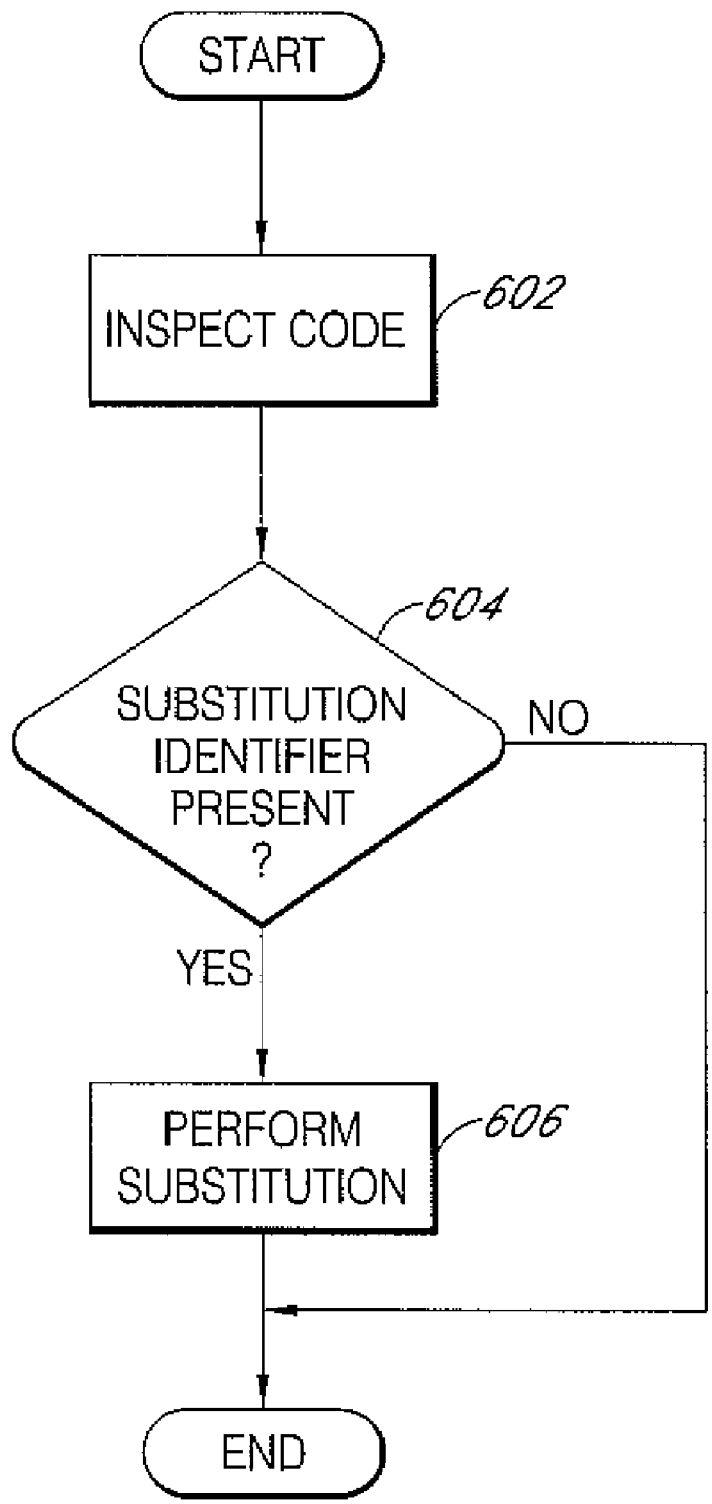
FIG. 6 illustrates a process that can be used to substitute an existing translation for a phrase.

FIG. 6 illustrates a process that can be used to substitute an existing translation for a phrase. The process can be implemented in block 408 of FIG. 4. An identifier, such as an identifier for a database, is placed in the source code 402. The identifier refers to an item in the dictionary file 404, which is then inserted into the executable code. An advantage of using identifiers is that it relieves the software developer of the source code 402 of the burden of managing translated text, of modifying code to match particular game consoles, of ensuring that messages to the game player comply with the requirements for certification from the game console vendors, and the like. It will be appreciated by the skilled practitioner that the illustrated process can be modified in a variety of ways. For example, in another embodiment, various portions of the illustrated process can be combined, can be rearranged in an alternate sequence, can be removed, or the like.

Figure 7A:
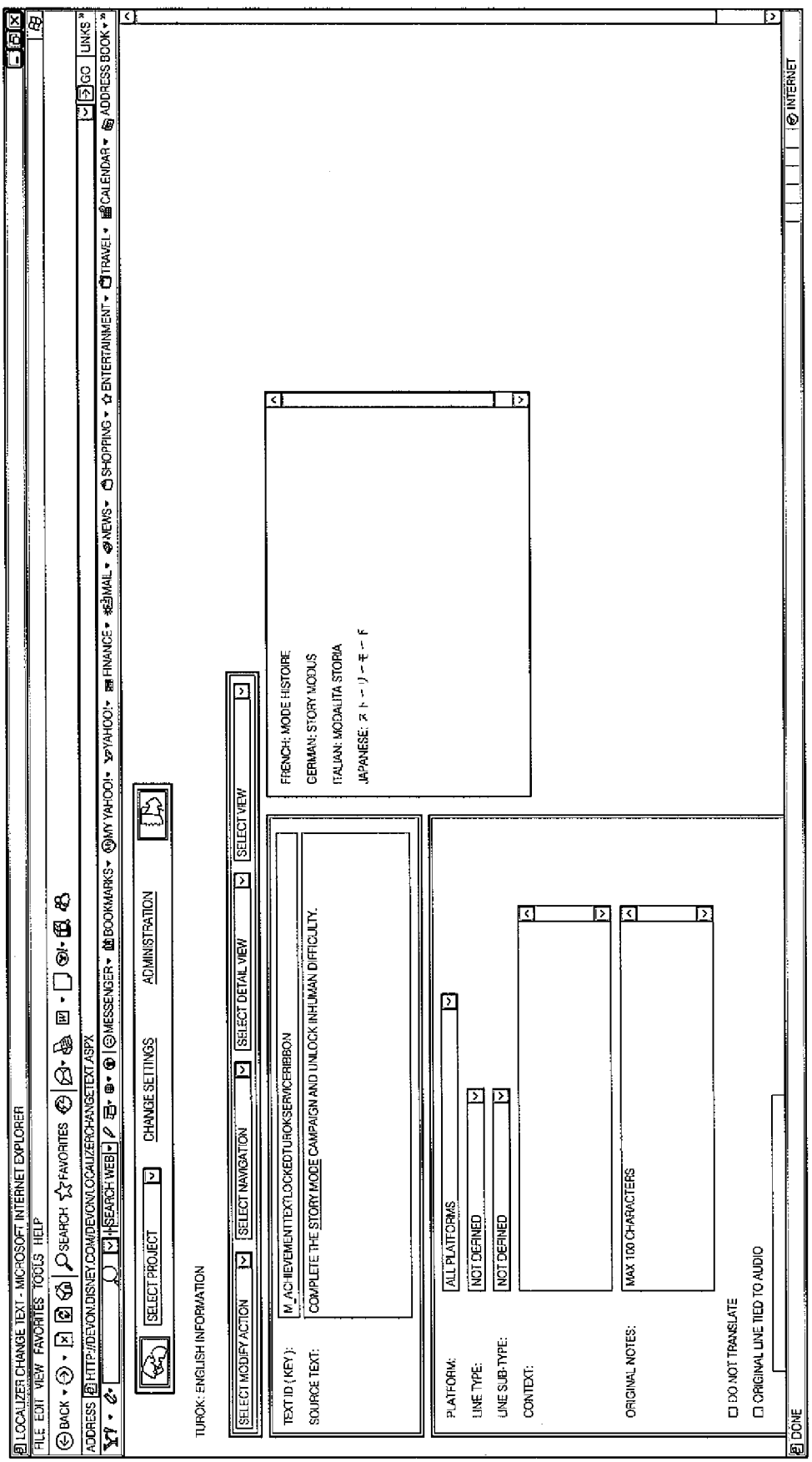
FIG. 7A illustrates a screenshot of a user interface for a translator in which the substitution appears as underlined text to inform the translator not to translate the underlined text.

The substitution can replace one or more words within a character string or can replace the entire character string. For example, names of game characters or names of locations (e.g., New York) can be substituted within a character string with the localized name for the game character or location, as a character name or location name is typically not literally translated. FIG. 7A illustrates a screenshot of a user interface for a translator in which the substitution appears as underlined text to inform the translator not to translate the underlined text. The screenshot in FIG. 7A illustrates the standard translations in French, German, Italian, and Japanese for "Story Mode." In addition, FIG. 7A illustrates that non-English alphabet characters can be referenced by the identifier. In another example, numerals other than Arabic numerals can be used.

Figure 7B:
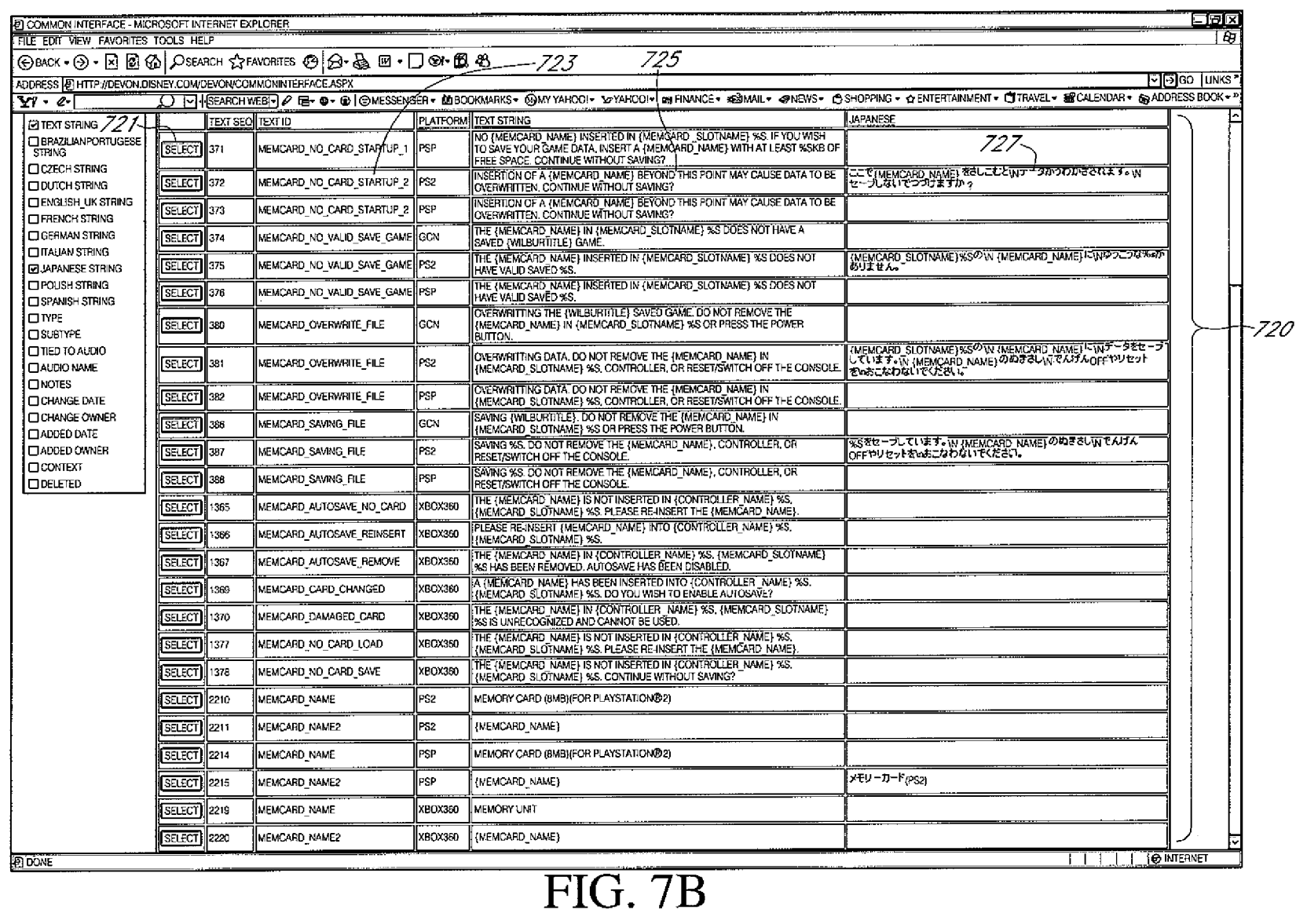

FIG. 7B illustrates a screenshot of a user interface 720 for a software developer to select an identifier for an appropriate phrase, symbol, game button, or the like. The user interface 720 includes a select button 721, a text identifier 723, a source string 725 and a localized string 727. In the example shown, the source string 725 corresponds to a string found the source language (e.g., English). The localized string 727 corresponds to a previously localized and approved translation (e.g., Japanese) for the source string. The text identifier permits referencing and selection of previously localized and approved strings. For example, the text identifier inserted in the source string 725 references to the localized string 727 in a database. The localized string 727 is then displayed along with the source string 725 in a user interface 720 such as one shown in FIG. 7B, so that a translator can view the localized string and make the selection if the localized string is satisfactory.

FIG. 7B illustrates a screenshot of a user interface 720 for a software developer to select an identifier for an appropriate phrase, symbol, game button, or the like. The user interface 720 includes a select button 721, a text identifier 723, a source string 725 and a localized string 727. In the example shown, the source string 725 corresponds to a string for the source (e.g., English) version of the game asset. The localized string 727 corresponds to a previously localized and approved translation (e.g., Japanese) for the source string. The text identifier 723 can be used as a reference for a link between the source string and the localized string in a database and permits referencing and selection of the localized string. For example, when the text identifier 723 is encountered in text to be localized, the localized string 727 can be displayed along with the source string 725 in a user interface 720 such as one shown in FIG. 7B. This way, users, e.g., a game developer 110, a translator 120, and a reviewer 130, can immediately view the previously localized and approved string and select to use the existing string if it is satisfactory given the context of the translation task.

In another example, the identifier is replaced by an entire character string. For example, a game console vendor can specify that certain messages to a user must read in a specified standardized manner in order to receive certification of the game from the game vendor. For example, game vendors typically specify standardized language for saving game progress, for warning messages, and the like. Such standardized language not only varies among the game console vendors, but also varies within the game console vendor specification for the language. Deviations from the specification can result in lengthy and costly delays in launching a game.

Returning now to FIG. 6, the process begins by inspecting 602 the source code for a video game being developed to determine 604 whether there is at least one substitution identifier to text or to a symbol present in the code. Typically, the source code is broken up into many different modules, known as subroutines. Accordingly, it will be understood that the process can inspect anywhere from a relatively small portion of the source code to all of the source code.

If a substitution identifier is present, the process proceeds to perform the appropriate substitution 606. The substitution can vary depending on the language or the game console, and can frequently depend on both the language and the game console. In one embodiment, the substitution is performed whenever the dictionary is compiled. However, items can be added to, modified, and/or pulled from the dictionary at other times, such as during coding, entry of new strings by the code developer, prototype testing, etc. Preferably, the substitution 606 is performed before items are translated to indicate when certain words should not be translated as shown in FIG. 7A.

Dictionary File

Figure 8A:
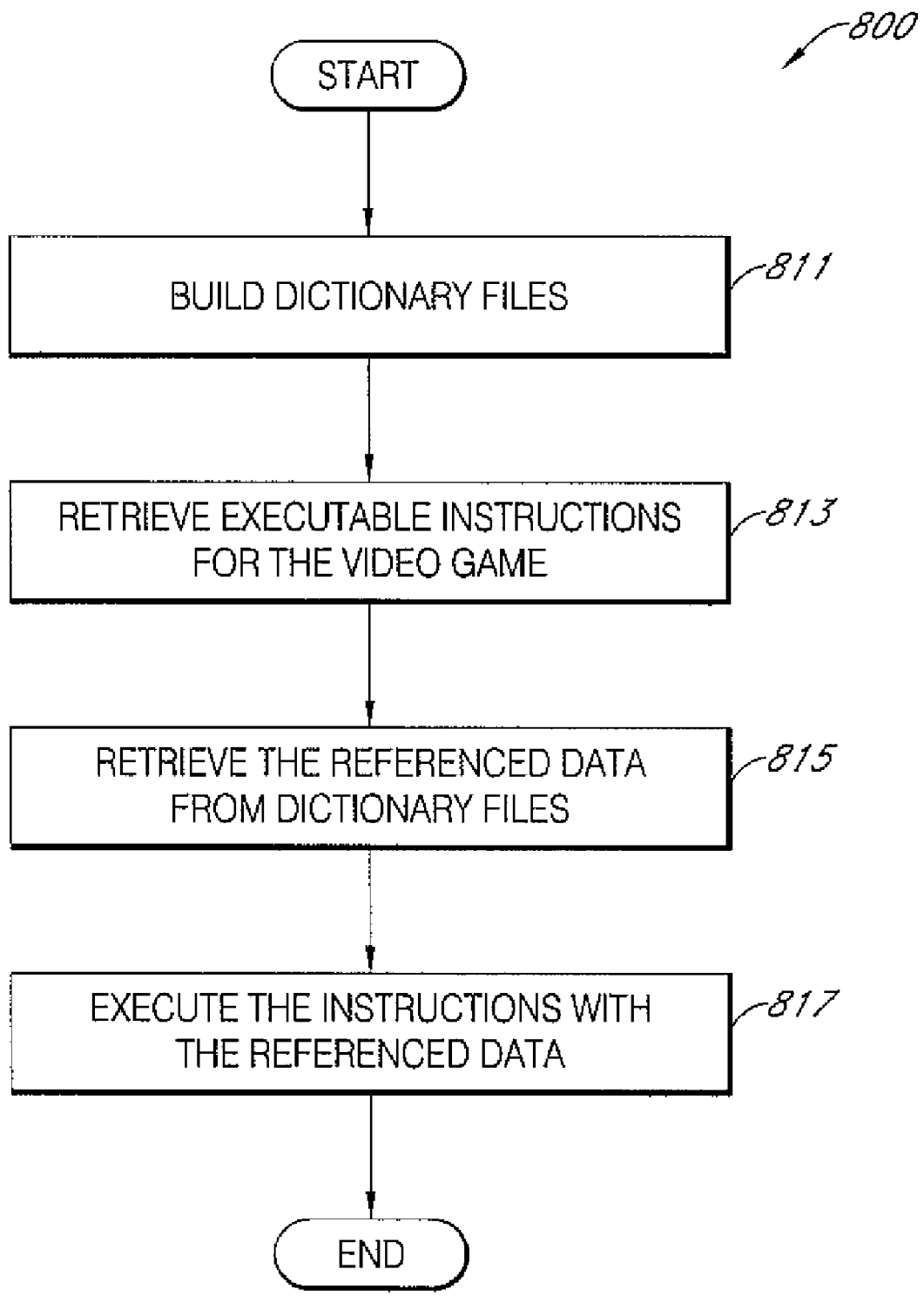
FIG. 8A is a flowchart illustrating an example process for building and using independent dictionary files during run time of a prototype in a game development system according to one embodiment.

FIG. 8A is a flowchart illustrating an example process 800 for building and using independent dictionary files during run time of a prototype in a game development system according to one embodiment. The process described below relates to how dictionary files are built during a game development according to some embodiments and, more importantly, how the dictionary files are used during a prototype. The process 800 starts at a state 811, where one or more dictionary files are built. The dictionary files refer to data files that include translated strings and that are accessed by executable code of a video game during run time. In certain embodiments, the dictionary files are independent in the sense that they do not become part of the executable code of the video game. In other embodiments, the dictionary files are built from localized strings stored in a database that are exported into various project formats, e.g., CSV, XML, binary, text, etc. In other embodiments, the dictionary files support binary format, and as a result, graphics may be inserted from the dictionary files into the displayed "text" lines. This is particularly useful in a video game development where button graphics have to be inserted into a text line. In yet other embodiments, the dictionary builder service is available over a wide area network, such as the Internet. The Internet embodiments allow the users, e.g., a game developer 110, a translator 120, and a reviewer 130, to work on the video game remotely instead of having to be on-site. Returning to FIG. 8A, the process then moves to a state 813, where, during run time of a prototype of a video game, one or more executable instruction for the prototype of the video game are retrieved, wherein some of the executable instructions make references to data, e.g., localized strings, stored in the one or more dictionary files. The process then moves to a state 817, where the instructions are executed with the retrieved referenced data.

Various advantages of building and using the independent dictionary files during a video game development should be apparent to the one skilled in the art. For example, users of the game development system are able to see the changes in the localized assets without having to rebuild the entire asset. Reviewers and translators may rebuild the dictionary files themselves and view the changes almost immediately in the video game under development without having to receive the entire asset with the dictionary files incorporated into executable code from the game developer. Reviewers can also view the finished product, check for length problems, and resubmit changes before the game developer sees the intermediate version.

Figure 8B:
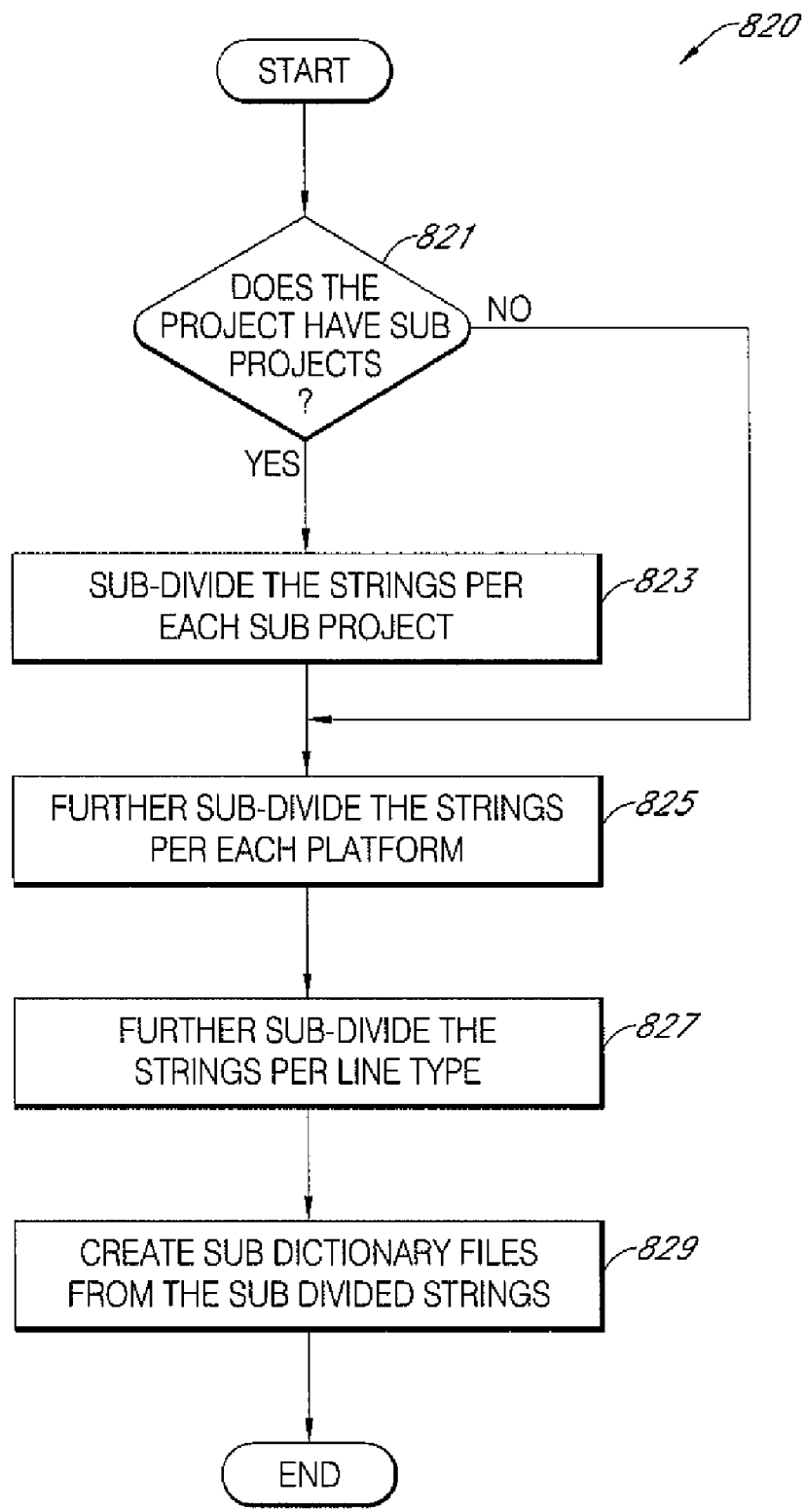
FIG. 8B is a flowchart illustrating an example process for generating sub dictionary files according to one embodiment.

FIG. 8B is a flowchart illustrating an example process for generating sub dictionary files according to one embodiment. In certain embodiments, the converted localized strings stored in the dictionary file described above may organized and stored in smaller individual sub dictionary files. This breakdown of the dictionary file into sub dictionary files is useful because a video game does not need to load all localized text for the game at once; instead, it typically loads sections of text at a time. The portion of the video game under development being tested can be compiled without using the entire dictionary file. Returning to FIG. 8B, the process 820 for generating sub dictionary files starts at a state 821, where it is determined whether the project is divided into multiple sub-projects. A project can have multiple sub projects, e.g., on screen text, script lines, etc. If the answer is YES, the process moves to a state 823, where the localized strings in the dictionary file are grouped or sub-divided under each sub project. If the answer is NO, the process skips the state 823. The process then moves to a state 825, where the sub-divided (or the original) entries are sub-divided under each console platform, e.g., XBOX® 360, PC, or PS3. The process then moves to a state 827, where the sub-divided entries are further sub-divided under each line type, e.g., navigation text, front end text, world level text, etc. The process then moves to a state 819, where various sub dictionary files are created from the sub-divided localized strings described above.

Glyphs Compliance Report

Figure 9A:
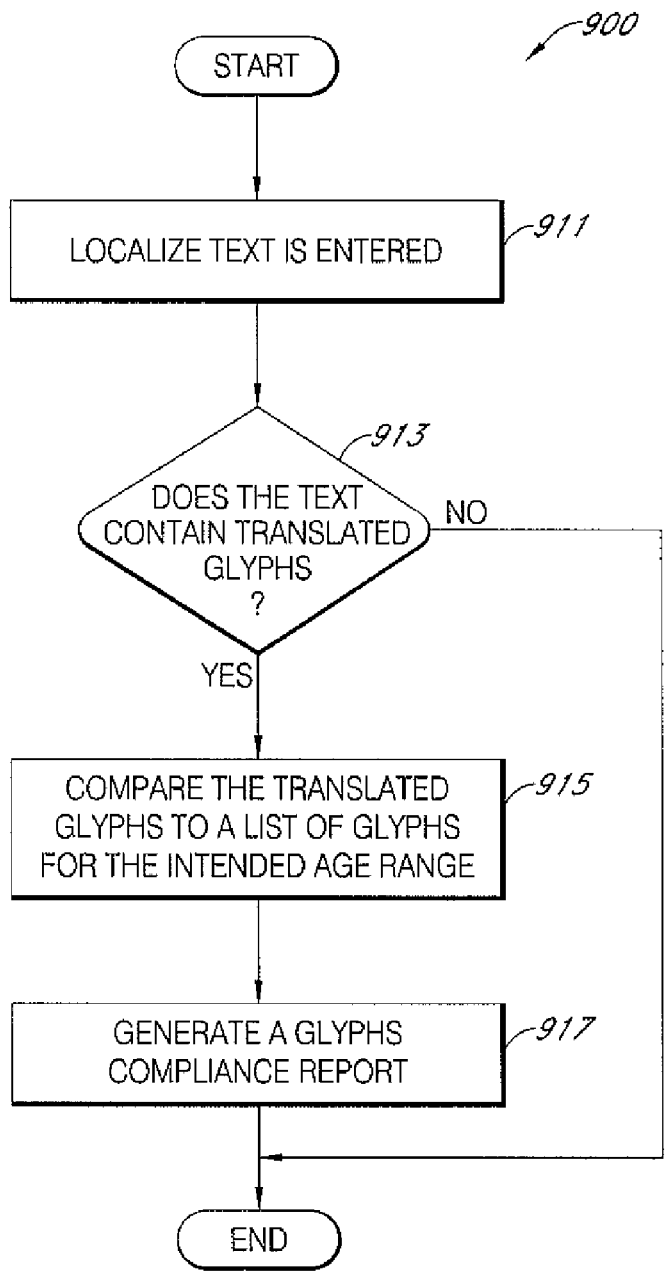
FIG. 9A is a flowchart illustrating an example process for generating a glyphs compliance report according to one embodiment.
Figure 9B:
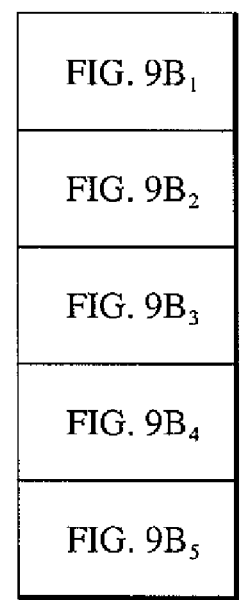
FIG. 9B consists of $9B_1$, $9B_2$, $9B_3$, $9B_4$, and $9B_5$ and illustrates a table containing approved glyphs classified according to different age groups according to one embodiment.

FIG. 9A is a flowchart illustrating an example process for generating a glyphs compliance report according to one embodiment. For localization into certain languages, e.g., Japanese, Chinese, and Korean, which may include glyphs, e.g., kanji or Chinese characters, it may be advantageous to classify approved glyphs according to age ranges of intended players. Children in those language regions are typically expected to know particular glyphs at particular age ranges. For example, children in the first grade are expected to be familiar with the glyphs listed in the 1st Grade column 921 as shown in FIGS. 9B-1 and 9B-2, but not with the glyphs listed in other columns 922-926. So, if the intended players of the game are children belonging to the $1^{st}$ Grade age group, for example, it is desirable to check the translated glyphs to confirm that the glyphs are listed under the 1st Grade column 921. To facilitate the compliance process for users, e.g., a translator or a reviewer, the game development system in certain embodiments is configured to generate glyphs compliance reports. Returning to FIG. 9A, the process 900 for generating the glyphs compliance report starts at a state 911, where localized text is added or entered into the game development system. The process then moves to a state 913, where it is determined whether the localized text contains any translated glyphs. In some embodiments, the localized text containing the translated glyphs is stored in a dictionary file described above with reference to FIGS. 8A and 8B. If the answer is NO, the process ends. If the answer is YES, the process moves to a state 915, where the translated glyphs are compared to a list of glyphs for the intended age range, e.g., the $1^{st}$ Grade. The process then moves to a state 917, where a glyphs compliance report is generated and sent to various users, including the translator who has translated the glyphs and the reviewer for the localized text. In certain embodiments, the report may list all translated glyphs and indicate, e.g., underline or highlight, those glyphs that fail the age-range compliance. In certain other embodiments, the report may also list those characters that are not in the Table 920, such as the one shown in FIG. 9B consisting of $9B_1$, $9B_2$, $9B_3$, $9B_4$, and $9B_5$.

In certain embodiments, the above-described method of automated management of video game localization workflow may be realized in a program format to be stored on a computer readable recording medium that includes any kinds of recording devices for storing computer readable data, for example, a CD-ROM, a DVD, a magnetic tape, a memory (e.g., capable of storing firmware), and memory card and a disk.

Various embodiments have been described above. Although described with reference to these specific embodiments, the descriptions are intended to be illustrative and are not intended to be limiting. Various modifications and applications may occur to those skilled in the art.

What is claimed is:

1. A computer-implemented method for managing localization workflow for a video game development, wherein the method is implemented in a computer system comprising one or more processors executing computer program modules, the method comprising:

determining that a string in an executable asset of a video game being developed that needs to be translated;

associating a translator with the string; and providing video metadata that has been associated with the string to the translator, wherein the video metadata includes video information that represents a view of game play of the video game being developed to be presented to players of the video game concomitantly with expression of the string during game play of the video game such that the translator is provided with context for the translation.

2. The method of claim 1, wherein providing video metadata to the translator comprises sending the video information for display on a Web page.

3. The method of claim 1, further comprising embedding the video metadata in an electronic file.

4. The method of claim 3, wherein the electronic file comprises a spreadsheet file.

5. The method of claim 3, further comprising storing one or both of the text to be translated and the translated text in the electronic file.

6. The method of claim 1, wherein the metadata further comprises information generated by the translator or a game developer and intended to be used by a reviewer of the translation.

7. The method of claim 1, wherein the metadata comprises different sets of metadata having different data types.

8. The method of claim 1, wherein the metadata includes an embedded program.

9. An apparatus for managing localization workflow for video game development, the apparatus comprising:

one or more processors configured to execute modules, the modules comprising:

a module configured to determine a string in an executable asset of a video game being developed that needs to be translated; and a module configured to provide video metadata that has been associated with the string to a translator associated with the string to be translated, wherein the video metadata includes video information that represents a view of the video game being developed to be presented to players of the video game concomitantly with expression of the string during game play of the video game such that the translator is provided with context for the translation.

10. The apparatus of claim 9, wherein the video metadata includes a video clip showing at least a game character associated with the string to be translated.

\* \* \* \* \*